(12) United States Patent
Cisneros

(10) Patent No.: US 8,454,773 B2
(45) Date of Patent: Jun. 4, 2013

(54) INDUCTION WELDED WATERPROOFING

(75) Inventor: Robert Cisneros, Marengo, IL (US)

(73) Assignee: Amcol International Corporation, Hoffman Estates, IL (US)

( * ) Notice: Subject to any disclaimer, the term of this patent is extended or adjusted under 35 U.S.C. 154(b) by 0 days.

(21) Appl. No.: 13/291,614

(22) Filed: Nov. 8, 2011

(65) Prior Publication Data

US 2012/0152437 A1   Jun. 21, 2012

Related U.S. Application Data

(60) Provisional application No. 61/411,002, filed on Nov. 8, 2010.

(51) Int. Cl.
| | |
|---|---|
| *E04B 2/96* | (2006.01) |
| *E04F 13/09* | (2006.01) |
| *E04F 13/21* | (2006.01) |
| *E04F 13/24* | (2006.01) |
| *B32B 7/04* | (2006.01) |
| *B32B 7/08* | (2006.01) |
| *B32B 37/12* | (2006.01) |
| *B32B 43/00* | (2006.01) |
| *B29C 65/32* | (2006.01) |
| *B29C 65/48* | (2006.01) |
| *B29C 65/56* | (2006.01) |
| *C09J 5/06* | (2006.01) |

(52) U.S. Cl.
USPC .............. 156/71; 156/91; 156/92; 156/272.4; 156/308.2; 156/308.4

(58) Field of Classification Search
USPC .............. 156/71, 91, 92, 272.2, 272.4, 308.2, 156/308.4
See application file for complete search history.

(56) References Cited

U.S. PATENT DOCUMENTS

| | | | |
|---|---|---|---|
| 4,389,826 A * | 6/1983 | Kelly | 52/410 |
| 4,534,925 A | 8/1985 | Harriett | |
| 4,534,926 A | 8/1985 | Harriett | |
| 4,778,702 A * | 10/1988 | Hutter, III | 428/40.9 |
| 4,841,706 A * | 6/1989 | Resan | 52/410 |

(Continued)

FOREIGN PATENT DOCUMENTS

| | | |
|---|---|---|
| CH | 593416 | 11/1977 |
| DE | 19521350 | 12/1996 |
| EP | 0735210 | 10/1996 |
| WO | WO-00/73596 | 12/2000 |

OTHER PUBLICATIONS

AQUADRAIN® 10X: Subsurface Drainage Composite, Tech Data, CETCO Building Materials Group, 2 pp. (Feb. 2006).

(Continued)

*Primary Examiner* — Sing P Chan
(74) *Attorney, Agent, or Firm* — Marshall, Gerstein & Borun LLP

(57) ABSTRACT

In accordance with an embodiment of the disclosure, A waterproofing laminate includes a drainboard having a first surface positioned against a hydraulic source and a second surface opposed to the first surface, a fastener plate positioned against the second surface of the drainboard securing the drainboard to the hydraulic surface, the fastener plate comprising a conductive element and a thermoplastic resin, and a self-healing hydraulic barrier comprising a thermoplastic surface adjoined to a geotextile and carrying a water-absorbent material, the thermoplastic surface inductively welded to the fastener plate.

7 Claims, 12 Drawing Sheets

U.S. PATENT DOCUMENTS

| | | | | |
|---|---|---|---|---|
| 4,977,720 | A * | 12/1990 | Kuipers | 52/408 |
| 5,496,615 | A * | 3/1996 | Bartlett et al. | 428/144 |
| 5,572,843 | A * | 11/1996 | Jordan | 52/410 |
| 5,580,630 | A | 12/1996 | Byrd | |
| 5,752,720 | A * | 5/1998 | Pynenburg | 281/2 |
| 6,124,016 | A * | 9/2000 | Weil | 428/99 |
| 6,229,127 | B1 | 5/2001 | Link | |
| 6,230,461 | B1 * | 5/2001 | Piront | 52/408 |
| 6,238,502 | B1 * | 5/2001 | Hubbard | 156/71 |
| 6,338,232 | B1 | 1/2002 | Yamanaka et al. | |
| 6,640,511 | B1 | 11/2003 | Link | |
| 6,689,460 | B2 * | 2/2004 | Wen et al. | 428/355 AC |
| 6,764,260 | B1 * | 7/2004 | Nebesnak et al. | 411/82 |
| 6,783,802 | B2 | 8/2004 | Darlington, Jr. et al. | |
| 6,952,902 | B2 * | 10/2005 | Yaros | 52/409 |
| 7,413,392 | B2 * | 8/2008 | Nebesnak et al. | 411/531 |
| 7,588,652 | B2 * | 9/2009 | Repp et al. | 156/108 |
| 7,631,468 | B2 * | 12/2009 | Gong et al. | 52/410 |
| 7,935,202 | B2 * | 5/2011 | Stanley | 156/71 |
| 8,061,098 | B2 * | 11/2011 | Whelan et al. | 52/409 |
| 8,104,245 | B2 * | 1/2012 | Whelan et al. | 52/741.4 |
| 2004/0056077 | A1 * | 3/2004 | Ito | 228/235.2 |
| 2005/0202197 | A1 * | 9/2005 | Mohseen et al. | 428/40.1 |
| 2006/0234029 | A1 * | 10/2006 | Thompson-Colon et al. | 428/304.4 |
| 2006/0234030 | A1 * | 10/2006 | Thompson-Colon et al. | 428/304.4 |
| 2007/0175170 | A1 * | 8/2007 | Shah | 52/741.1 |
| 2008/0104917 | A1 * | 5/2008 | Whelan et al. | 52/408 |
| 2008/0245010 | A1 | 10/2008 | Pollack | |
| 2008/0307734 | A1 * | 12/2008 | Whelan et al. | 52/411 |
| 2008/0309014 | A1 * | 12/2008 | Whelan et al. | 277/316 |
| 2009/0113841 | A1 * | 5/2009 | Whelan et al. | 52/741.4 |
| 2010/0119820 | A1 * | 5/2010 | Ultsch | 428/343 |

OTHER PUBLICATIONS

AQUADRAIN® 15X: Subsurface Drainage Composite, Tech Data, CETCO Building Materials Group, 2 pp. (Feb. 2006).

AQUADRAIN® 15XP: Subsurface Drainage Composite, Tech Data, CETCO Building Materials Group, 2 pp. (Feb. 2006).

AQUADRAIN® 18H: Subsurface Drainage Composite, Tech Data, CETCO Building Materials Group, 2 pp. (Feb. 2006).

AQUADRAIN® 20H: Subsurface Drainage Composite, Tech Data, CETCO Building Materials Group, 2 pp. (Feb. 2006).

AQUADRAIN® 30H: Subsurface Drainage Composite, Tech Data, CETCO Building Materials Group, 2 pp. (Feb. 2006).

AQUADRAIN® G20: Subsurface Geonet Drainage Composite, Technical Data, CETCO Building Materials Group, 2 pp. (Oct. 2010).

COREFLEX Thermoplastic Waterproofing Membrane with APC Technology™, CETCO, 6 pp. (Jun. 2010).

GEOTEX® 3201, Product Data Sheet, Propex Geosynthetics, 1 page (2006).

GEOTEX® 1701 Product Data Sheet, Propex Geosynthetics, 1 page (2006).

VOLCLAY Ultraseal® Brochure, 6 pp. (Jun. 2009).

International Search Report and Written Opinion for corresponding international application No. PCT/US2011/059716, mailing date Oct. 22, 2012.

* cited by examiner

INDUCTION WELDED WATERPROOFING

CROSS-REFERENCE TO RELATED APPLICATION

The benefit under 35 U.S.C. §119(e) of U.S. Provisional Patent Application Ser. No. 61/411,002 filed Nov. 8, 2010, is hereby claimed, and its entire disclosure is incorporated herein by reference.

FIELD OF DISCLOSURE

The present disclosure is applicable to sub-grade waterproofing, preferably the formation of a self-healing waterproof barrier prior to the pouring or placement of the structural element to be waterproofed.

BRIEF DESCRIPTION OF RELATED TECHNOLOGY

Traditionally, the membrane is welded to thermoplastic fixing anchors placed over the cushion/drainage layer(s); then the thermoplastic membrane waterproofing sheets are welded to the fixing anchors with hand held air welding equipment. This requires the installer to get behind the suspended membrane from the top, bottom or sides of the suspended sheets in order to access the fixing anchors to weld them to the thermoplastic waterproofing membrane. There are other non-penetrating methods however; all require access to the back side of the membrane. This step is not only time consuming but can be dangerous, especially when working on scaffolding and or in confined space.

SUMMARY OF INVENTION

Attaching membrane waterproofing to shoring in a manner that does not penetrate the waterproofing membrane has several traditional solutions that favor small membrane sheet or panel sizes. Large prefabricated or factory fabricated panels pose challenges that require additional steps and or equipment. These additional steps reduce installation efficiency and combined with the additional equipment increase installation cost. Placing large prefabricated panels on large shoring walls requires access behind the waterproofing membrane panels. Typically, this requires lifting a panel that is affixed at the top, from the bottom and allowing it to drape down to available fastening tabs. This step greatly increases the time required for operating the equipment used to suspend the membrane panels; typically a crane or lift of some type. Alternately, another method requires access to the back side of the membrane to weld the thermoplastic membrane to thermoplastic fastening discs. Bored rock tunnels additionally challenge typical membrane installation methods due to the confined space and inverted arch configuration of the structure. Unique to all other waterproofing applications, a bored rock tunnel is the only type of waterproofing that requires fixing the waterproofing membrane to overhead shoring; and specifically to a shoring surface with a closing radius.

BRIEF DESCRIPTION OF THE DRAWING FIGURES

DETAILED DESCRIPTION OF THE INVENTION

Figure 1:
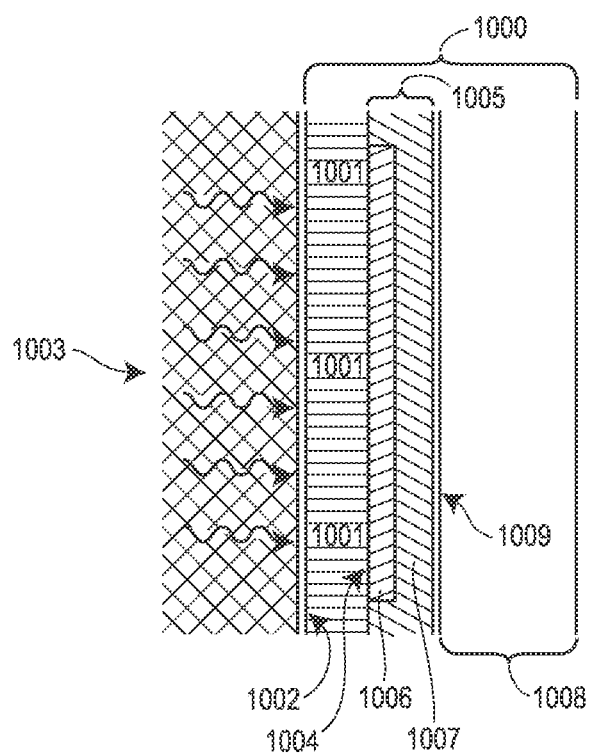
FIG. 1 is a cross-section of a water-proofing laminate against a hydraulic source in accordance with an embodiment of the disclosure.
Figure 2:
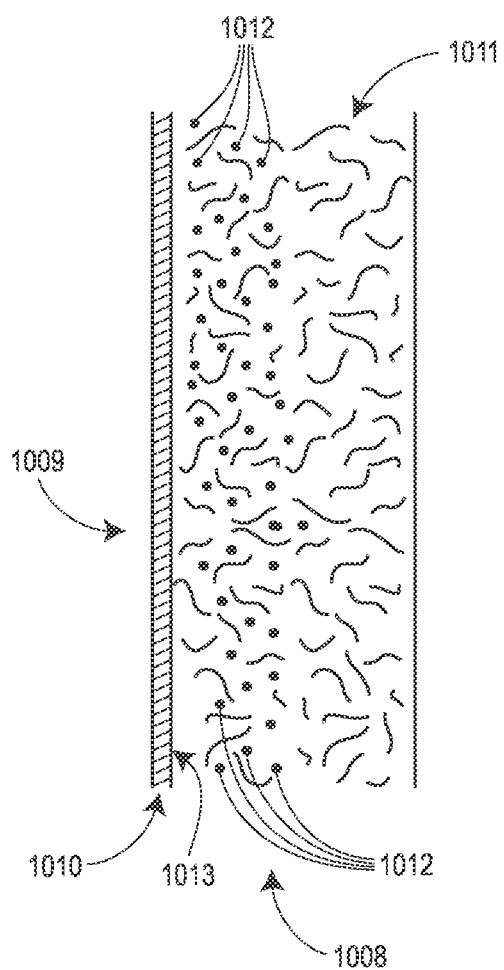
FIG. 2 is a cross-section of a water proofing laminate having self-healing hydraulic barrier in accordance with an embodiment of the disclosure.
Figure 3A:
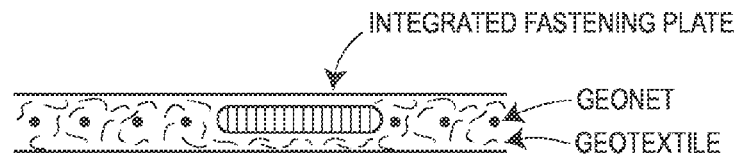
FIGS. 3A-3C are three cross-sections of embodiments of a fastener integrated drainboard in accordance with an embodiment of the disclosure and FIG. 3D is a schematic drawing of an external view of a fastener integrated drainboard in accordance with an embodiment of the disclosure.
Figure 3B:
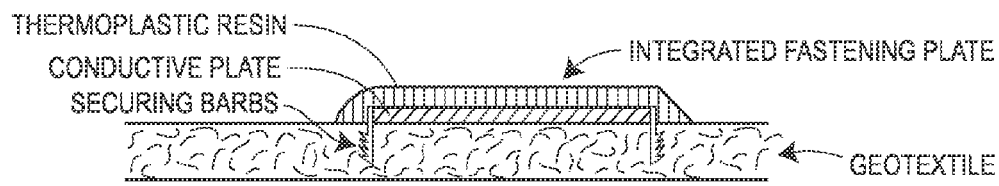
Figure 3C:
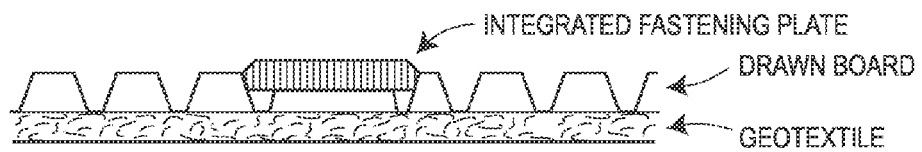
Figure 3D:
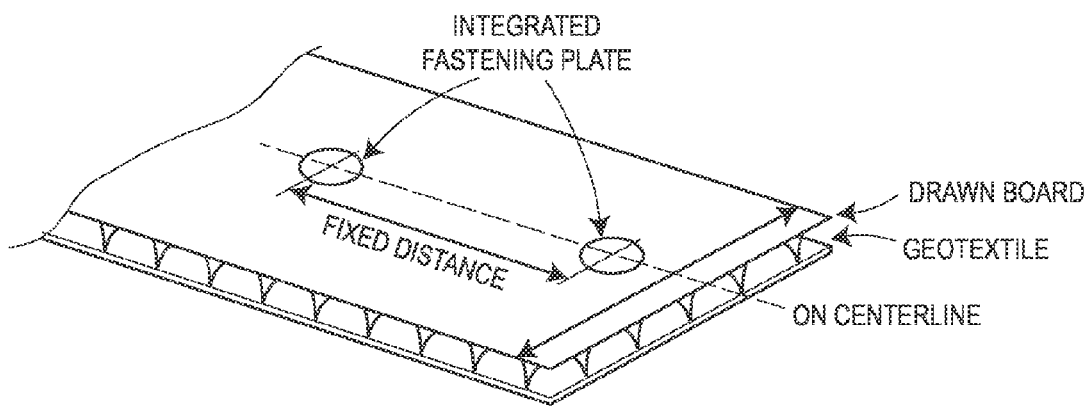
Figure 4:
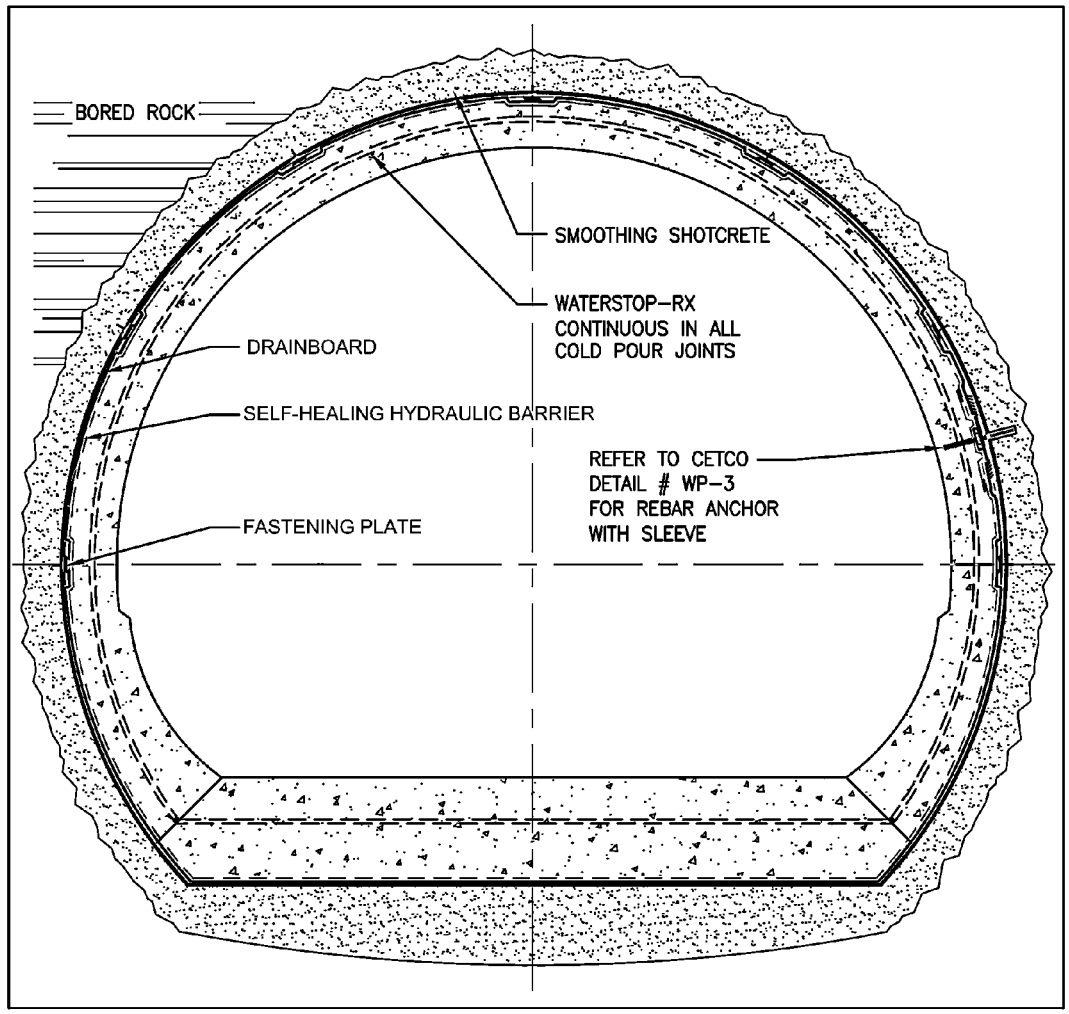
FIG. 4 is a schematic drawing of a water-proofing laminate in accordance with the disclosure used to water-proof the internal area of a bored rock tunnel.
Figure 5:
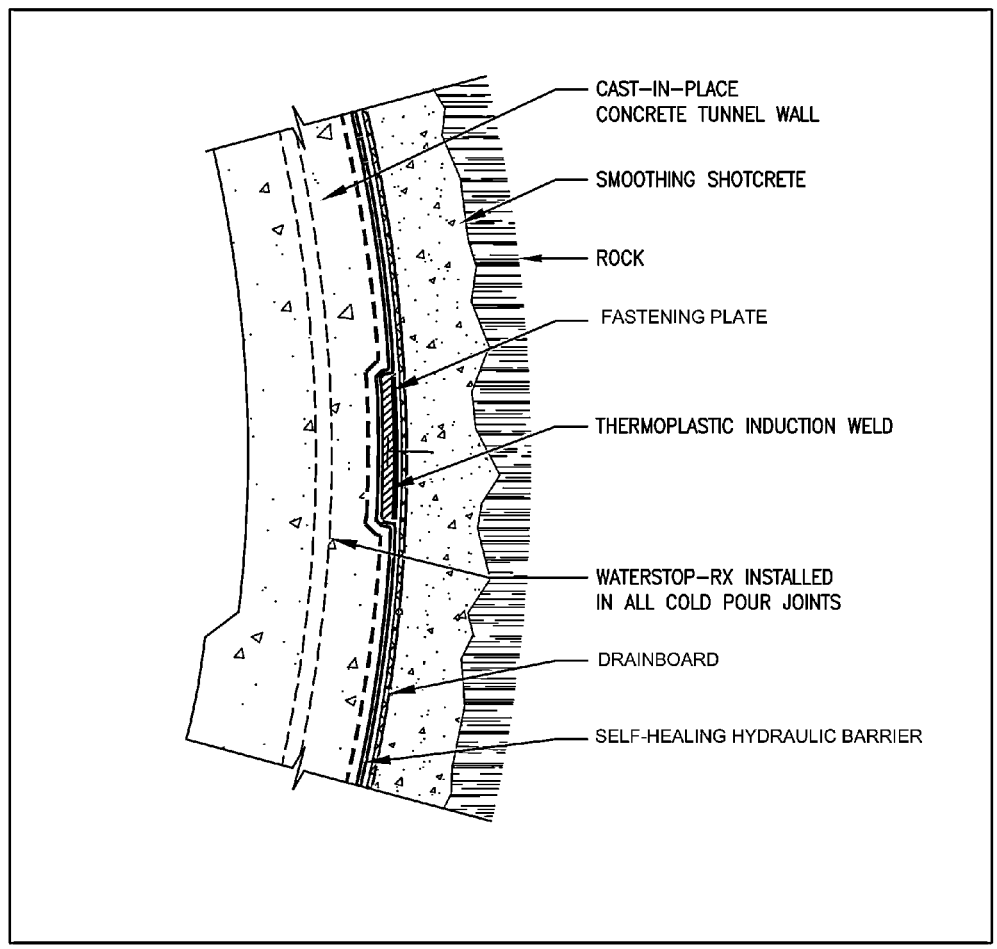
FIG. 5 is a schematic drawing of fastening plate portion of water-proofing laminate in accordance with an embodiment of the disclosure in a bored rock tunnel.
Figure 6:
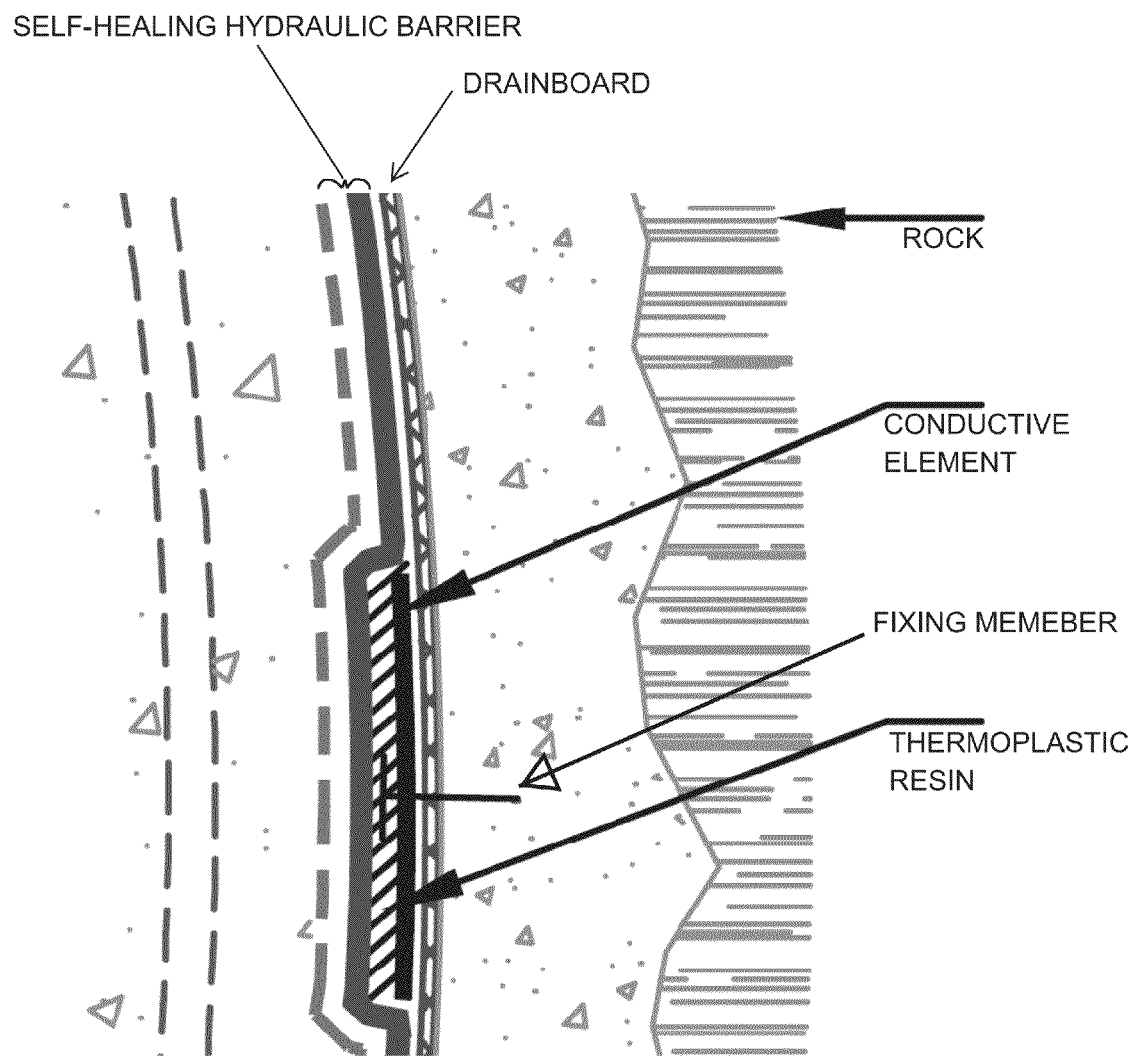
FIG. 6 is an enlarged schematic drawing of the fastening plate portion of FIG. 5.
Figure 7:
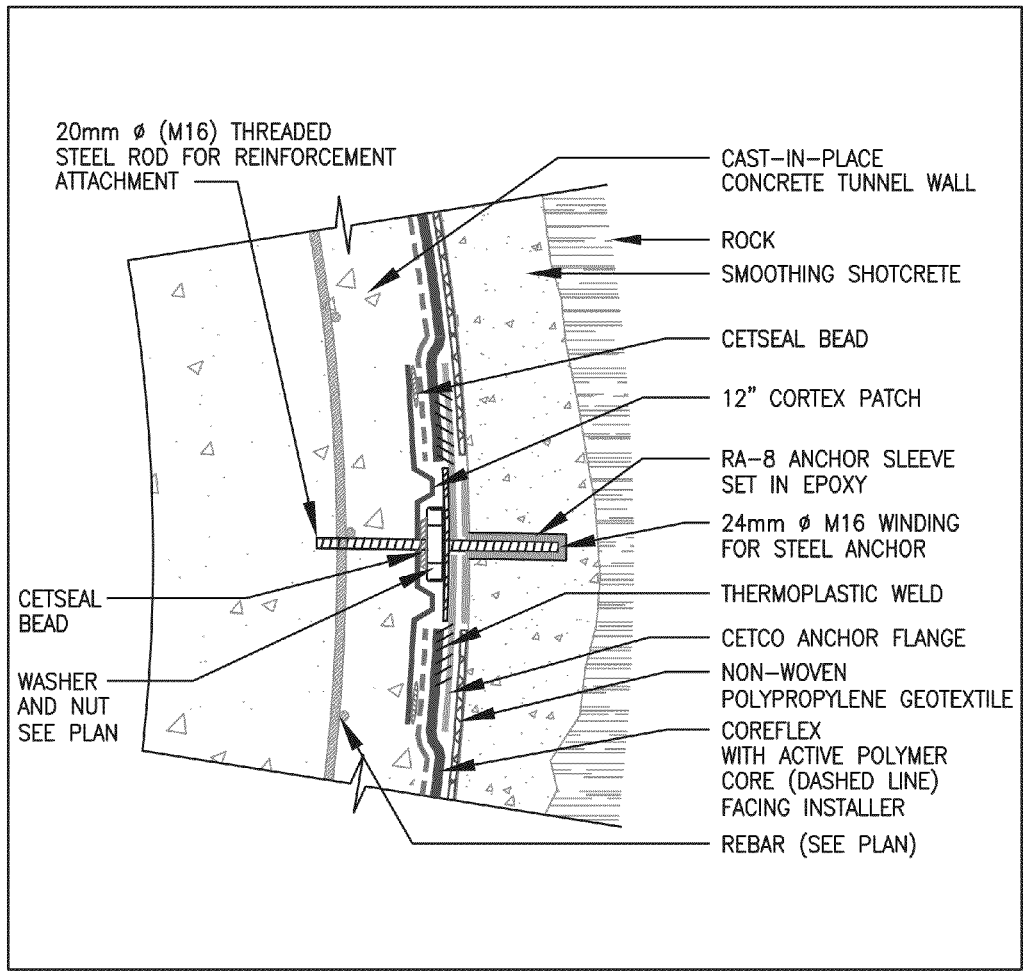
FIG. 7 is a schematic drawing of a reinforcement positioned through a self-healing waterproofing laminate and optional water-proofing elements in accordance with an embodiment of the disclosure.

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Herein is described materials and methods of water-proofing a structural feature from a hydraulic source, preferably wherein the hydraulic source is sub-grade (below ground). Examples of sub-grade hydraulic sources include retaining walls, shoring walls; unlined rock walls and tunnels; and porous cement (e.g., shotcrete coatings) that are in contact with ground water and, preferably, are at or below the water table. Typically, the hydraulic source is a sub-grade structure through which ground-water can flow. Further examples, include cut or excavated rock walls, bored rock tunnels, excavated soil, foundation backfill, the retaining and/or shoring walls erected to prevent collapse of an excavated area.

The following reference numbers correspond to FIGS. 1-7.

In a first embodiment, a water-proofing laminate 1000 includes a drainboard 1001 having a first surface 1002 positioned against a hydraulic source 1003 and a second surface 1004 opposed to the first surface; a fastener plate 1005 positioned against the second surface 1004 of the drainboard 1001 securing the drainboard 1001 to the hydraulic surface 1003, the fastener plate 1005 comprising a conductive element 1006 and a thermoplastic resin 1007; and a self-healing hydraulic barrier 1008 comprising a thermoplastic surface 1009 adjoined to a geotextile and carrying a water-absorbent material, the thermoplastic surface 1009 inductively welded to the fastener plate. Furthermore, the drainboard can be secured to the hydraulic source by a fixing member (e.g., a mechanical fastener) where at least a portion of a fixing member passes through the fastener plate and the drainboard and into the hydraulic source.

A drainboard is a drainage material, preferably including a geotextile through which water can flow. The drainboard can include the geotextile or can be entirely the geotextile. Examples of drainboards that include geotextiles include, but are not limited to, AQUADRAIN products, for example product numbers G20, 10X, 15X, 15XP, 18H, 20H, 30H, G20, and 100BD (all available from CETCO, Hoffman Estates, Ill.); GEOTEX 3201 and GEOTEX 1701 (available from PROPEX GEOSYNTHETICS, Chattanooga, Tenn.). In all applications of a drainboard the geotextile is positioned against the hydraulic source.

Drainboards can further include drainage cores adhered to the geotextile. A drainage core can be a three dimensional, preferably water impervious, material having support columns and drainage areas, herein called a dimple core. The geotextile is bonded to the support column, functions in part as a particulate filter, and defines an interior drainboard space where drainage or flow of water can occur. Alternatively, the drainage core can be a geonet, in one example the geonet can be positioned between layers of the geotextile. Typically, drainboards are positioned in locations wherein the hydraulic source supplies a hydraulic force on the drainboard, preferably on the water permeable geotextile portion.

Herein, a fastener plate includes a conductive element and a thermoplastic resin. Preferably the fastener plate consists essentially of a plate-like main member made from the thermoplastic resin, and a conductive sheet made of the conductive element that is adhered to the main member. In one example, the conductive sheet can be provided as a layer within the plate-like main member. In another example, the fastener plate can include a conductive support having a securing surface, a welding surface, and comprising the conductive element where the welding surface is carrying the thermoplastic resin. Multiple examples of fastener plates are available commercially, examples are represented in U.S. Pat. Nos. 6,640,511 and 6,338,232, the entire disclosures of which are incorporated herein by reference.

The self-healing hydraulic barrier 1008 can include a thermoplastic surface 1009 adjoined to a geotextile 1011 and carrying a water-absorbent material 1012. The thermoplastic surface 1009 is preferably carried by a thermoplastic layer 1010 that is more preferably a water-impermeable layer. The thermoplastic, water-impermeable layer 1010 is adhered to the geotextile 1011. For example the thermoplastic layer can include an adhesive layer 1013 that binds to the geotextile, the adhesive layer can further adhere the water-absorbent material. In one example, the self-healing hydraulic barrier carries the water-absorbent material between the thermoplastic surface and the geotextile, for example, the water-absorbent material can be adhered to the thermoplastic layer. In another example the geotextile is impregnated with the water-absorbent material. In another example, the self-healing hydraulic barrier includes the thermoplastic layer, a water-absorbent layer, and the geotextile; where the water-absorbent layer adheres the geotextile to the thermoplastic layer.

The water-absorbent material of the self-healing hydraulic barrier can be selected from the group consisting of a superabsorbent polymer, a clay, and a mixture thereof. In one embodiment, the water-absorbent material can be a salt-water swellable composition. One example of a salt-water swellable composition includes about 30 wt. % to about 60 wt. % of a smectite clay; about 5 wt. % to about 25 wt. % of a partially cross-linked acrylamide/partially neutralized acrylic acid copolymer; about 3 wt. % to about 15 wt. % of at least one elastomeric resin; about 5 wt. % to about 30 wt. % of a cationic flocculant; and about 0.5 wt. % to about 25 wt. % of at least one primary plasticizing agent for the elastomeric resin.

In one embodiment of the self-healing hydraulic barrier, the self-healing hydraulic barrier described is based on the discovery that agricultural grade superabsorbent polymers partially cross-linked (water insoluble) copolymers of acrylamide/partially neutralized acrylic acid, particularly potassium and/or sodium acrylate, have exceptional and unexpected free swell when in contact with high conductivity water or multivalent ion-containing-contaminated water The self-healing hydraulic barrier can include a partially cross-linked acrylamide/acrylate/acrylic acid copolymer and are used for waterproofing against high conductivity salt-containing water. More particularly, the partially cross-linked acrylamide/acrylate/acrylic acid copolymers, are incorporated into sheet or roll form as waterproofing geotextile articles; or are incorporated into deformable, putty-like consistency articles for waterproofing concrete joints and the like (see U.S. Pat. No. 4,534,926, hereby incorporated by reference) by substituting the agricultural grade SAPs described herein for the bentonite clay disclosed in U.S. Pat. No. 4,534,926. The sheet or roll form geotextile articles of manufacture described herein are self-healing (will seal cuts, cracks and fissures caused in adjacent water barrier sheets or films during or after installation) and are particularly effective in sealing seems between two water barrier substrates, e.g., concrete sections and between adjacent, geocomposite liners in contact with high conductivity salt water.

The self-healing hydraulic barrier is preferably a multilayer geocomposite article that can include a polymeric barrier layer, a woven or non-woven layer, and an intermediate layer of a partially cross-linked acrylamide/acrylate/acrylic acid copolymer that has sufficient free-swell when contacted by high conductivity water such that if a crack or rupture occurs in the polymeric barrier layer, the confined copolymer will swell sufficiently upon salt water contact to fill the crack or rupture to heal the crack or rupture and prevent further salt water leakage.

In another embodiment, the water-proofing laminate can include a hydraulic surface exposed to a hydraulic source and carried by a drainboard; the drainboard held in a fixed position by a fastener plate; and the fastener plate welded to a thermoplastic surface carried by a shelf-healing hydraulic barrier.

In yet another embodiment, the water-proofing laminate can include a hydraulic surface carried by a drainboard; a dry surface carried by a self-healing hydraulic barrier; and positioned between the hydraulic surface and the dry surface; a fastener plate affixed to the drainboard and welded to a self-healing hydraulic barrier.

In still another embodiment, the water-proofing laminate can include a plurality of fastener plates individually comprising a conductive element and a thermoplastic resin; and a self-healing hydraulic barrier comprising a thermoplastic layer adjoined to a geotextile and carrying a water-absorbent material; wherein the self-healing hydraulic barrier is adjoined to the plurality of fastener plates by a plurality of induction welds formed between the thermoplastic layer and the thermoplastic resin. Typically, the induction weld includes three heat effected zones: a fastener plate zone, a fusion zone, and a self-healing hydraulic barrier zone. Preferably, the fastener plate zone has a volume larger than the individual volumes of either the fusion zone or the self-healing hydraulic barrier zone. Additionally, the fastener plate zone is preferably approximately coextensive with the volume of the thermoplastic resin, that is, preferably, the entire thermoplastic resin is heated during the welding process and forms the fastener plate (heat effected) zone.

Further presented herein is a method of preparing a water-proofing laminate. The method can include positioning a thermoplastic surface of a self-healing hydraulic barrier against a fastening plate secured to a hydraulic source; and then inductively welding the thermoplastic surface and the fastening plate. The method can further include securing the fastening plate to the hydraulic source. For example, securing the fastening plate to the hydraulic source by passing a fixing member through the fastener plate and into the hydraulic source. The fixing member can be selected from those mechanical fasteners capable of holding the fastening plate to the hydraulic source, these include concrete fasteners, screws, drive pins, and nails. The method can further include positioning a drainboard between the hydraulic source and the fastening plate; and then securing the fastening plate to the hydraulic source with the fixing member by passing a fixing member through the fastener plate and drainboard and into the hydraulic source. The method can still further include sealing any seams between overlapping or abutting layers of the self-healing hydraulic barrier, for example between overlapping layers of the thermoplastic surface.

In another embodiment the method includes fixing a fastening plate to a hydraulic source by, for example, powder actuating or pneumatic actuating a fixing member through the fastener plate; and then inductively welding a self-healing hydraulic barrier to the fastening plate. The powder actuating can be accomplished by employing, for example, a powder-actuated nail gun, multiple examples of which are commercially available. Similarly, pneumatic actuating can be accomplished by employing, for example, a pneumatic nail or screw gun, multiple examples of which are commercially available.

In yet another embodiment, the method can be a method of waterproofing a tunnel that includes positioning a drainage material against a tunnel wall and/or ceiling, the drainage material having a first surface positioned against the tunnel wall and/or ceiling and a second surface exposed; attaching the drainage material to the tunnel wall and/or ceiling with a plurality of fastener plates and fixing members extending through the fastener plates and the drainage material and adhered to the tunnel wall and/or ceiling, the fastener plates comprising a conductive element and a thermoplastic resin; and inductively welding a self-healing hydraulic barrier to the fastener plates, the self-healing hydraulic barrier comprising a water-impermeable thermoplastic layer adjoined to a water-absorbent material and a geotextile.

The method of waterproofing a tunnel can also include applying shotcrete against bored rock in a tunnel to form a smoothed tunnel wall and/or ceiling; and curing the shotcrete; where the drainage material is positioned against the smoothed tunnel wall and/or ceiling. Still further, the method of waterproofing a tunnel can include applying concrete against the geotextile to form a interior tunnel wall and/or ceiling; and curing the concrete. Additionally, the method of waterproofing a tunnel can include applying a water-stop to all concrete joints.

Dependant on the flow characteristics of the tunnel design, the method of waterproofing the tunnel can include positioning the drainage material against the tunnel floor, the drainage material have a first surface positioned against the tunnel floor and a second surface exposed; and covering the drainage material with the self-healing hydraulic barrier by positioning the water-impermeable thermoplastic layer against the drainage material. In circumstances where waterproofing is not applied to the floor of the tunnel, a pump system can be installed to remove water that may enter the tunnel through the unwaterproofed area.

In still another embodiment, the method can be a method of applying a water-proofing laminate to a retaining and/or shoring wall that includes positioning a drainage material against the retaining and/or shoring wall, the drainage material have a first surface positioned against the retaining and/or shoring wall and a second surface exposed; attaching the drainage material to the retaining and/or shoring wall with a plurality of fastener plates and fixing members extending through the fastener plates and the drainage material, and adhered to the retaining and/or shoring wall, the fastener plates comprising a conductive element and a thermoplastic resin; and inductively welding a self-healing hydraulic barrier to the fastener plates, the self-healing hydraulic barrier comprising a water-impermeable thermoplastic layer adjoined to a water-absorbent material and a geotextile. This method of waterproofing a retaining wall and/or shoring wall can include applying concrete against the geotextile to form a water-proofed subgrade wall; and curing the concrete; wherein the concrete binds to the geotextile.

A further embodiment of the above disclosed embodiments includes providing a structural anchor through the water-proofing laminate. One example of providing a structural anchor can include all or fewer steps of providing a mounting hole in the hydraulic source, fixing at least a portion of an anchor in the mounting hole (e.g., applying an epoxy to the internal surface of the mounting hole), providing a thermoplastic flange over the anchor and against the mounting hole and hydraulic source, overlaying the thermoplastic flange with a self-healing hydraulic barrier, thermally weld (e.g., hot air weld, induction weld) a thermoplastic surface of the self-healing hydraulic barrier to the thermoplastic flange. The method can further include overlaying the weld with a patch flange (e.g., CORTEX PATCH available from CETCO, Hoffman Estates, Ill.); and/or applying sealants to seams and joints (e.g., CETSEAL available from CETCO, Hoffman Estates, Ill.). Preferably, the anchor extends from the hydraulic source at sufficient distance to provide for the attachment of structural elements (e.g., structural reinforcements) added prior to the providing of a concrete against the self-healing hydraulic barrier.

In still another embodiment, the preceding materials and methods of waterproofing a structure can employ a fastener-integrated drainboard. Such a fastener-integrated drainboard is a drainboard with a fastener plate adhered thereto. For example, the fastener-integrated drainboard can include a water-permeable sheet; and a fastener plate affixed to the water-permeable sheet; the fastener plate comprising a thermoplastic adhesive and a metal receptor. The fastener plate can be affixed to the water-permeable sheet by an adhesive, for example, a pressure sensitive adhesive, a polyurethane adhesive, an epoxy adhesive, a silicone adhesive, thermoplastic adhesive; by a clip or a plurality of clips; by barbs extending through the water-permeable sheet; or mixtures thereof. Dependent on the size of the fastener-integrated drainboard, it preferably includes a plurality of fastener plates. For example, the fastener plates can be positioned at regular intervals on the water-permeable sheet, for example 3 feet to 4 feet on center. When for example, the resultant fastener-integrated drainboard has an area of about 4 feet by greater than 4 feet (often drainboards are sold as 4'×52' rolls), the fastener plate can be integrated on center (about two feet from either edge) and spaced at about 3 to about 4 feet along the length of the fastener-integrated drainboard. When, for example, the drainboard is a non-rolling sheet material, the fastener plates can be integrated in a regular grid pattern on the drainboard, for example, about 1 foot to about 4 foot on center. Alternatively, the spacing of the fastener plates can increase as a function, for example distance from an edge.

One embodiment of preparing the fastener-integrated drainboard can include fixing a fastener plate that comprises a metal receptor and a thermoplastic adhesive to a water-permeable sheet. Another embodiment of preparing the fastener-integrated drainboard can include positioning a metal receptor against a water-permeable sheet; applying a thermoplastic adhesive to the metal receptor; and heating the thermoplastic adhesive to a sufficient temperature to form a adhesive bond between the metal receptor and the water-permeable sheet.

The fastener-integrated drainboard can be employed in a method that includes positioning a fastener-integrated drainboard that comprises a fastener plate against a hydraulic source; powder actuating or pneumatic actuating a fixing member to secure the fastener-integrated drainboard to the hydraulic source by passing at least a portion of the fixing member through the fastener plate; and then inductively welding a self-healing hydraulic barrier to the fastener plate. This method can further include those features described above.

Self-healing hydraulic barriers can include the following methods and materials:

One Example of a Hydraulic Barrier

The disclosure of U.S. Pat. No. 6,783,802 is incorporated herein by reference in its entirety.

Referring to the drawing of U.S. Pat. No. 6,783,802, the invention relates to a hydraulic barrier material. In one embodiment, the hydraulic barrier material is an interlocking matrix containing a water-absorbent organic polymer and a water-absorbent clay interlocked to and within a liquid monomer-absorbent or liquid monomer-adsorbent substrate, wherein the polymer is formed (polymerized from one or more monomers), in-situ, while in contact with the substrate during manufacture of the hydraulic barrier to interlock the polymer and clay to the substrate. In the preferred embodiment, the hydraulic barrier material is an interlocking matrix of organic polymer molecules, polymer-intercalated clay, polymer-intercalated clay tactoids, exfoliated clay platelets and fibers of a fibrous substrate, preferably a non-woven geotextile. The preferred organic polymer is a water-absorbent polymer preferably comprising a mixture of an alkali metal salt of polyacrylic acid (50-90 mole percent—corresponding to 50-90 mole percent neutralization of acrylic acid) and polyacrylic acid (10-50 mole percent). It has been found that the interlocking of the organic polymer, polymer-intercalated clay tactoids, and clay platelets to the substrate provides a hydraulic barrier material having a relatively low permeability to water while containing a relatively low loading of organic polymer.

It has further been found that the hydraulic barrier material provides reduced permeability to water per unit weight of hydraulic barrier material as compared to conventional liners or hydraulic barriers, and in particular, geosynthetic clay liners (GCLs). Particularly, it has been found that the hydraulic barrier material has a hydraulic conductivity of $1\times10^{-9}$ cm/sec. or less. Further, it has also been found that the hydraulic barrier material has a reduced thickness and a reduced weight as compared with conventional GCLs, while achieving better water impermeability. The hydraulic barrier material may be particularly suitable for geo-environmental applications such as water absorption, water retention and water containment. For instance, the hydraulic barrier material may have particular application for use in below grade water proofing, such as underground parking garages, shopping malls and the like to prevent ground water intrusion; waste landfills; man-made bodies of water; and other geo-environmental applications where a low permeability hydraulic barrier is required. In the preferred embodiment, the organic polymer is formed from the polymerization of an organic monomer intercalated into a clay, preferably a water-swellable clay. The method of making the hydraulic barrier material includes the steps of embedding a polymerizable organic monomer within a liquid-sorbent substrate after first applying a polymerization catalyst or polymerization initiator to the liquid-sorbent substrate, or to one or more of the component parts of the liquid-sorbent substrate, e.g., to fibers of geotextile during the manufacture of the geotextile, and effecting polymerization of the polymerizable monomer, in situ, to form the hydraulic barrier material.

The polymerizable monomer is applied to the polymerization-initiating substrate from a polymerization solution that is a slurry of the polymerizable organic monomer and a water-swellable clay, such as a sodium smectite clay, particularly a sodium montmorillonite or a sodium bentonite clay, to form a slurry that is embedded into the porous substrate that has previously been treated, e.g., contacted or dipped or sprayed, to contain a polymerization catalyst or polymerization initiator for the organic monomer in an amount sufficient to fully polymerize the subsequently embedded monomer. In the preferred embodiment, the substrate is loaded with at least 5% by weight polymerization initiator, or polymerization catalyst, based on total weight of polymerizable monomer subsequently embedded in the substrate from the polymerization solution (polymerization slurry). More preferably, the substrate is loaded with at least 10% by weight polymerization initiator and/or polymerization catalyst based on the weight of subsequently embedded polymerizable monomer.

The polymerizable monomer preferably is mixed with water 7 and includes a neutralizing agent 8, such as sodium hydroxide, preferably prior to the addition of the clay 9, to form the polymerization solution in the form of a slurry, in order to more easily effect neutralization of least a portion of the polymerizable organic monomer (most preferably 65-85 mole percent neutralization) before clay addition and subsequent intercalation of the partially neutralized polymerizable organic monomer into the clay. Preferably, the polymerization solution also contains a cross-linking agent for the polymer so that after polymerization, the partially neutralized polymer molecules are cross-linked sufficiently for water-insolubility and water absorbency. Preferably, the polymerizable monomer, water, cross-linking agent, and neutralizing agent are thoroughly mixed to form a homogeneous solution prior to adding clay to form the polymerization solution or slurry for consistency and homogeneity in intercalation of the clay. In the preferred embodiment, the polymerization solution mixing step is performed such that the polymerization solution is substantially homogeneous.

The step of adding clay to the monomer solution to form the polymerization solution or polymerization slurry may be performed in any manner that results in the addition of a desired amount of the clay and monomer to form a slurry that is relatively viscous, but is capable of being moved to the polymerization-initiating substrate for embedment. In addition, the polymerization solution containing the clay is preferably sheared during mixing and/or sheared while embedding the slurry into the liquid-sorbent or porous substrate to intercalate a portion of the polymerizable monomer between clay platelets prior to embedding the slurry into the substrate, and preferably to partially exfoliate the clay platelets prior to, or simultaneously with, contacting the substrate with the polymerization solution.

The degree of mixing of the slurry will vary depending upon the desired characteristics of the slurry. For instance, the clay may be simply combined together with the polymerization solution with no concern regarding the degree of mixing or homogeneity of the resulting slurry. Preferably, the mixing step is performed such that the slurry is mixed and sheared prior to the subsequent embedding of the slurry into the catalyst- or initiator-containing porous substrate. In the preferred embodiment, the mixing step used to form the slurry is performed such that the slurry is substantially homogeneous.

Any mixer 16 and any mixing method may be used which are capable of mixing the clay and the monomer to achieve the desired characteristics of the slurry. Thus, in the preferred embodiment, any mixer 16 and any mixing process may be used which are capable of mixing the clay and the polymerization solution such that the resulting slurry is substantially homogeneous. Further, the mixing step may be performed for any period or length of time sufficient to achieve the desired characteristics of the slurry. In the preferred embodiment, the mixing step is performed for a length of time sufficient to mix the clay and the polymerization solution such that the resulting slurry is substantially homogeneous. Minimum water is preferably used to obtain a homogeneous slurry, while producing a slurry that is capable of being mechanically conveyed or pumped to the substrate for embedding the slurry into the substrate. As shown in FIG. 1, in the preferred embodiment, a piston 32 of piston pump assembly 30 is used to convey the high viscosity slurry to the liquid-sorbent substrate for the embedding step. If the slurry is too viscous for pumping, a conveyor belt, preferably having a slurry-covered width that is the same as the substrate, can be used to move the slurry to the substrate.

As indicated above, the monomer embedding step comprises commingling the polymerizable organic monomer/clay slurry with the substrate.

In the preferred embodiment, the slurry is embedded within the catalyst-containing, liquid-sorbent substrate at a slurry viscosity of about 30,000 centipoises to about 80,000 centipoises, more preferably about 40,000 to about 60,000 centipoises, for absorption and/or adsorption of the slurry into and/or between the components of the substrate. The slurry is received into at least a portion of the thickness of the substrate. Any amount or degree of embedding of the slurry into, or between the component parts of the substrate is acceptable so long as the embedding of the monomer is sufficient to permit the commingling and sorption of the monomer and clay between and/or within the component parts, e.g., the fibers of the substrate, for subsequent polymerization of the monomer internally within at least a portion of the thickness of the substrate to form the hydraulic barrier material. Further, the degree or amount of embedding is sufficient if it permits the bonding or interlocking of the resulting absorbent polymer and clay within at least a portion of the thickness of the porous substrate.

Preferably, the embedding step includes combining the substrate, and the slurry such that the slurry is distributed uniformly throughout at least a portion of the thickness of the substrate. The slurry is preferably well mixed, and more preferably is substantially homogeneous, so that combining the slurry and the substrate also results in the distribution of the monomer, monomer-intercalated clay, and exfoliated clay platelets throughout a desired thickness of the substrate. More preferably, the slurry is distributed throughout the entire thickness of the porous substrate in order to facilitate the production of a relatively homogeneous hydraulic barrier material.

As discussed previously, the porous substrate may be any porous material or substance compatible with the monomer and any other components contained with the polymerization slurry, where applicable. Any porous substrate may be used that is able to receive and retain at least a portion of both the polymerization catalyst or polymerization initiator, and subsequently the polymerizable monomer(s) and clay to form the hydraulic barrier material upon the polymerization of the monomer. More preferably, the porous substrate is comprised of a fibrous substrate having a plurality of fibers. Any fibrous substrate can be used that is able to form the hydraulic barrier material upon the polymerization of the monomer.

In the preferred embodiment, the substrate is a geotextile material. Any woven or non-woven geotextile material may be used, preferably non-woven. Further, the geotextile material may be in any form compatible with providing the desired hydraulic barrier material. However, in the preferred embodiment, the fibrous substrate is a substantially planar sheet comprising at least one layer of geotextile material.

In the preferred embodiment, the embedding step is comprised of embedding the slurry, having a water content of less than 50% by weight, and thus the monomer and clay, between the fibers of the initiator- or catalyst-containing fibrous substrate. The embedding step may be performed in any manner, and by any apparatus, resulting in the embedding of the high viscosity slurry between, and/or absorbed within the component parts, e.g., fibers, of the substrate. In other words, the slurry can be embedded or directed within the interstitial spaces or voids between and/or absorbed within the fibers of the fibrous substrate, and/or may be absorbed by the fibers of the substrate. For instance, the slurry may be embedded between the fibers of the fibrous substrate by vacuum, scrubbing, rolling, hydraulic loading, pressure filtration or spraying. If the fibers themselves are water-absorbent, the monomer will be absorbed into the fibers as well.

In the preferred embodiment, at least a portion of the slurry is embedded between the fibers of the fibrous substrate in the interstitial spaces or voids. The remainder or balance of the slurry which is not embedded may be dispersed or spread among the fibers of the fibrous substrate or distributed upon or about the fibers to provide a layer or coating of the slurry. Any amount or degree of embedment of the slurry between the fibers of the substrate, sufficient to permit the subsequent polymerization of the monomer, is acceptable.

In the preferred embodiment, the bulk or major fraction or proportion of the slurry is embedded in the substrate, while a small or minor fraction or proportion of the slurry optionally may be dispersed or distributed on top of the substrate. Preferably, any slurry that may be distributed on top of the substrate has a thickness of less than about 2.0 mm, more preferably less than about 1.0 mm, most preferably less than about 0.50 mm.

Further, in the preferred embodiment, the slurry is embedded between the fibers of the fibrous substrate by applying a compressive force to the fibrous substrate. The compressive force is preferably applied in a direction substantially perpendicular to the plane of the fibrous substrate, as discussed further below. The compressive force may be applied in any manner, and by any method, or apparatus that results in the desired degree or amount of embedding of the slurry between the fibers of the fibrous substrate.

For instance, the compressive force may be applied to the fibrous substrate with at least one pair of pressure rollers 18 as shown in FIG. 1. In addition, the compressive force may be applied to the fibrous substrate using a vacuum.

Following the embedding step, the process comprises the step of effecting the polymerization of the monomer to form the hydraulic barrier material. The polymerization of the monomer may be effected in any manner, and by and method, process, apparatus or device, capable of, and suitable for, polymerizing the monomer to form a hydraulic barrier material having the desired properties and characteristics. Preferably, polymerization of the monomer is effected by heating the monomer in a continuous oven after the embedding step. Preferably, the heating step is sufficient to dry the hydraulic barrier to less than about 15% by weight moisture, more preferably about 7-12% by weight moisture. based on the day weight of the hydraulic barrier 10.

The heating step may be performed at any temperature above the boiling point of water to polymerize the monomer and form the hydraulic barrier material. However, the temperature of the heating step may vary depending upon the desired characteristics and properties of the resulting hydraulic barrier material. It has been found that the slurry is preferably heated to a temperature of at least 100° C. (212° F.), more preferably about 149° C. to about 288° C., most preferably about 177° C. to about 288° C., particularly about 204° C. to about 260° C. In the most preferred embodiment, the slurry is heated to a temperature of between about 232° C. and about 260° C.

Any heater and any heating process may be used which are capable of heating the slurry, and thus the monomer, to the desired temperature to polymerize the monomer while embedded within substrate, without melting or otherwise degrading the substrate. Further, the heating step may be performed for any length of time sufficient to form a hydraulic barrier material having the desired water barrier properties. For instance, the heating step may be performed for a period between about 30 seconds and about 2 hours. However, the amount of the monomer polymerized by the heating step may vary depending upon the length and temperature of the heating step, which may affect the characteristics or properties of the resulting hydraulic barrier material. Further, the duration of the polymerization reaction or the period of performance of the heating step has been found to be inversely proportional to the polymerization temperature.

In accordance with an important advantage of the preferred embodiment of the manufacturing method disclosed herein, no significant polymerization of the monomer occurs prior to embedding the polymerization slurry into the substrate, with most polymerization occurring during the indicated polymerization step or heating step, since the polymerization catalyst or polymerization initiator is isolated from the monomer until the monomer is embedded in the substrate. Thus, in the preferred embodiment, no significant polymerization of the monomer occurs prior to the embedding of the slurry between the fibers of the initiator- or catalyst-containing fibrous substrate. Thus, prior to the heating step, the polymerization of the monomer does not occur until the monomer is embedded within the initiation- or catalyst-loaded substrate. The inhibiting of monomer polymerization prior to the monomer embedding step is a significant advantage of the manufacturing method disclosed herein. As well, depending upon the intended application of the hydraulic barrier material, the hydraulic barrier material may optionally include a covering sheet and/or a carrier sheet (not shown). Specifically, the covering sheet is preferably applied along at least one side of the substrate, being a geotextile material in the preferred embodiment.

In the preferred embodiment, the substrate can be any water-absorbent or water-adsorbent sheet material. Further, the substrate is preferably a fibrous substrate having a plurality of fibers. More preferably, the fibrous substrate is a geotextile material. Any geotextile material, including both woven and non-woven geotextiles, having any weight and formed from any material capable of withstanding the polymerization temperature, may be used which is compatible with the intended application of the hydraulic barrier material and which will provide a hydraulic barrier material having the desired water barrier properties. However, preferably, the geotextile material has a unit weight of between about 0.05 and 0.80 kg/m$^2$, more preferably between 0.10 to 0.40 kg/m$^2$, most preferably between 0.10 to 0.20 kg/m$^2$.

Further, the geotextile material may be in any form compatible with providing the desired hydraulic barrier material in any size or shape to fit any area to be protected against substantial water contact. In the preferred embodiment, the fibrous substrate is a substantially planar sheet comprising at least one layer of the geotextile material. Thus, as discussed above, in the preferred monomer embedding step, a compressive force is applied in a direction substantially perpendicular to the plane of the geotextile material. In the preferred embodiment, the fibrous substrate is comprised of a layer of geotextile material, such as PETROMAT 4597, PETROMAT 4551 or PETROMAT 4506 manufactured by Amoco, or, more preferably, a polyester material GEO-4-REEMAY 60, manufactured by Foss, Inc., having a thickness of 2 mm; or another polyester material, 25WN040-60, manufactured by CUMULUS Corporation, at a thickness of 5 mm.

In the preferred embodiment, the aqueous polymerization solution includes water, a polymerizable organic monomer, and a water-swellable clay. Any organic monomer able to be polymerized to provide a water-absorbent organic polymer, may be used. However, preferably, the organic monomer has the following structural formula:

wherein R is selected from the group consisting of an alkali metal, H, CH$_3$, CH$_2$CH$_3$, CH(CH$_3$)$_2$; and mixtures thereof.

In the preferred embodiment, the monomer is selected from the group consisting of acrylic acid, an alkali metal acrylate, e.g., sodium acrylate, and particularly mixtures thereof containing 50-90 mole percent of an alkali metal acrylate and 10-50 mole percent acrylic acid, more preferably about 65-85 mole percent alkali metal acrylate and 15-35 mole percent acrylic acid, based on the total moles of polymerizable acrylic acid monomer.

It has been found that the weight ratio of the organic monomer (or polymer) to clay embedded into the substrate sufficient to produce the desired hydraulic barrier material most efficiently, with little to no drying required after monomer polymerization, should be in the range of 1:1 to 1:5, preferably in the range of 1:1 to 1:4, most preferably in the range of 1:2 to 1:4, based on the total weight of monomer, neutralized monomer and clay in the slurry.

The invention disclosed herein is useful for loading any porous substrate, particularly sheet material, with a monomer/clay slurry wherein the polymer is polymerized, in-situ, after pre-loading the porous substrate with sufficient polymerization catalyst and/or polymerization initiator to completely polymerize the polymerizable monomer(s) while in contact with the substrate, without premature monomer polymerization.

The polymerization solution preferably also includes a cross-linker for the monomer. Any cross-linker compatible with the organic monomer and capable of, and suitable for, cross-linking the organic monomer may be used. However, the cross-linker is preferably selected from the group consisting of phenol formaldehyde, terephthaladehyde, and N,N'-methylene bisacrylamide (MBA) and mixtures thereof. In the preferred embodiment, the cross-linker is comprised of N,N'-methylene bisacrylamide.

Any amount of the cross-linker or any ratio of the cross-linker to the monomer sufficient to cross-link the monomer to the desired degree may be used. However, as indicated above, the actual amount or ratio of cross-linker used will vary depending upon, among other factors, the desired characteristics or properties of the hydraulic barrier material, including its water-absorbing capacity (WAC). For instance, it has been found that as the ratio of the cross-linker to the monomer is increased, the water solubility of the resulting absorbent polymer tends to decrease. However, in addition, as the ratio of the cross-linker to the monomer is increased, the WAC of the resulting absorbent polymer tends to decrease. Thus, a desired balance must be achieved between the WAC and the water solubility of the absorbent polymer comprising the hydraulic barrier material. In one embodiment, the ratio by weight of the cross-linker to the monomer contained in the slurry is less than about 1:100, preferably between about 1:1000 and about 1:100, more preferably in the range of 1:750 to 1:250, most preferably in the range of 1:600 to 1:400.

Further, the polymerization solution is preferably an acidic solution. Specifically, the polymerization solution preferably has a pH level of less than 7. The pH level of the polymerization solution may be adjusted in any manner and by any substance or compound able to provide the acidic solution and which is compatible with the components comprising the polymerization solution. However, the polymerization solution is preferably further comprised of a sufficient amount of a caustic compound to neutralize preferably 50-100 mole %, more preferably 50-90 mole % of the monomer, e.g., acrylic acid, which forms a neutralized polyacrylate, in-situ, most preferably 65-85 mole %.

Any caustic compound can be used that is capable of at least partially neutralizing the monomer or the formed polymer. Preferably, the caustic compound is selected from the group consisting of sodium hydroxide, potassium hydroxide, ammonium hydroxide, and mixtures thereof. In the preferred embodiment, the caustic compound is sodium hydroxide.

As indicated previously, an amount of water-swellable clay is preferably added to the polymerization solution to form the slurry. Any water-swellable clay able to be intercalated with polymerizable monomer after being hydrated in water and mixed with the polymerization solution to form the slurry, as described above, may be used. Preferably, the clay is a water-swellable clay selected from the group consisting of montmorillonite, saponite, nontronite, laponite, beidellite, iron-saponite, hectorite, sauconite, stevensite, vermiculite, and mixtures thereof. The preferred water-swellable clays are smectite clays, preferably a sodium smectite clay, particularly sodium montmorillonite and sodium bentonite. Other, non-water-swellable clays or fillers can be added to the polymerization solution, such as calcium carbonate, talc, mica, vermiculite, acid activated clays (where a hydrogen ion has replaced the sodium) kaolin, talc, silicon dioxide, titanium dioxide, calcium silicate, calcium phosphate and the like, so long as the polymerization solution includes at least about 5% water-swellable clay, preferably at least about 20% by weight water-swellable clay, based on the weight of polymerizable monomer in the polymerization slurry.

The particular weight ratio or relative amounts of the organic monomer and clay will be selected to fall within the ratio of about 20% to about 50% by weight monomer (including neutralizing agent) and about 50% to about 80% by weight clay, based on the total weight of monomer neutralized monomer and clay in the polymerization slurry.

Finally, as indicated previously, the aqueous slurry, includes an amount of water, preferably fresh water. In accordance with an important feature of the preferred methods and articles described herein, the polymerization slurry should contain less than about 50% by weight water, preferably less than about 45% by weight water, based on the total weight of the slurry. Preferably, the slurry comprises between about 30 percent and about 50 percent water by total weight of the slurry. In the preferred embodiment, the slurry includes between about 35 percent by weight and about 45 percent by weight water based on the total weight of the slurry, to permit pumping via piston 32. A slurry having as low as about 20% by weight water can be conveyed to the substrate for embedding into the substrate using a conveyor (not shown) while providing sufficient water for homogeneous distribution of the monomer throughout the clay.

Referring to the drawing, an apparatus and method are provided for continuously producing the hydraulic barrier material. First, a layer of the geotextile material comprising the fibrous substrate is fed through a bath of polymerization catalyst or polymerization initiator 20 and passed through a pair of squeeze rollers to remove excess catalyst and/or initiator. Alternatively, the polymerization catalyst and/or polymerization initiator can be spray-applied to the substrate from spray nozzles. In accordance with a preferred embodiment, the substrate is saturated with the polymerization catalyst and/or polymerization initiator followed by applying vacuum to the undersurface of the saturated substrate by vacuum device that is in contact with the undersurface of the saturated substrate for removal of the excess polymerization catalyst and/or polymerization initiator for recycle to the process. The catalyst-loaded and/or initiator-loaded fibrous substrate, after removal of excess catalyst and/or initiator, then is fed under guide roller and between a pair of horizontally disposed embedding rollers, where the slurry is squeezed (compressed) into the catalyst-containing and/or initiator-containing substrate.

The slurry is mixed in slurry container where the slurry components are mixed with a mixer. Once mixed and preferably sheared in slurry container, the mixer includes slurry scrapers and is raised from the container and the container is moved along tracks so that the container is disposed directly under piston pump assembly that includes a high pressure, vertically moveable piston. Piston then is moved downwardly within container to force the high viscosity, low water content slurry through a flexible 8 inch diameter conduit for spreading the slurry into a V-shaped slurry-receiving trough between the squeeze rollers. The high viscosity slurry is difficult to force through a narrow conduit so that it is preferred to use a conduit that has a diameter of at least about 4 inches. Between the embedding rollers, the slurry is deposited onto the layer of the geotextile comprising the fibrous substrate containing a polymerization-initiating catalyst and/or initiator, as the substrate is moved between the embedding rollers. The geotextile material containing the polymerization catalyst and/or polymerization initiator passes in contact with embedding rollers, which applies a compressive force to embed the slurry between the fibers of the fibrous substrate.

The compressed geotextile with the embedded slurry then passes through a heater or oven for polymerizing the monomer and to interlock the resulting polymer and the clay into the substrate. The polymerization results in the interlocking of the resulting polymer and clay with the fibers of the geotextile material. As a result, the hydraulic barrier material is formed. If desired, the hydraulic barrier material may be subsequently dried and later rolled and packaged.

The hydraulic barrier material will expand when contacted with water. It has been found that upon contact with water, the unfilled voids or interstitial spaces of the fibrous substrate will first fill up with hydrated polymer gel. Further hydration of the polymer gel will cause the entire hydraulic barrier material to expand. Further, it has been found that under a standard load of an effective confining stress of 20 kPa, the hydraulic conductivity of the hydraulic barrier material described herein tends to be less than or equal to about $1 \times 10^{-9}$ cm/sec. Further, the hydraulic conductivity has been generally found to decrease as the effective confining stress is increased.

Salt-Water—Self-Healing Hydraulic Barrier

EXAMPLE 1

The Following Reference Numbers Correspond to FIGS. 8A to 8F

As used herein, the term "salt water" refers to aqueous solutions that contain acids, bases, and/or, preferably salts. Preferably, the salt water contains ions that for example can be $H^+$, $Na^+$, $K^+$, $Mg^{2+}$, $Ca^{2+}$, and/or $Al^{3+}$. One method for determining if a aqueous solution is salt water is through a conductivity measurement. Conductivity is a measure of the level of ion concentration of a solution. The more salts, acids or bases are dissociated, the greater the conductivity of the solution. In water or wastewater it is mainly a matter of the ions of dissolved salts, and consequently the conductivity is an index of the salt load in wastewater. The measurement of conductivity is generally expressed in S/cm (or mS/cm) which is the product of the conductance of the test solution and the geometric factor of the measuring cell. For purposes of this invention, salt water is defined as water with a conductivity greater than 15 mS/cm, preferably greater than 20 mS/cm, and more preferably greater than 25 mS/cm. Conductivity can be measured using a variety of commercially available test instruments such as the Waterproof PC 300 handheld meter made by Eutech Instruments/Oakton Instruments.

In the preferred embodiment, a composition containing (i) a water-insoluble, partially cross-linked acrylamide/partially neutralized acrylic acid copolymer; (ii) a smectite clay; (iii) an elastomer, e.g., butyl rubber; (iv) a plasticizing agent, e.g., polybutene, polypropene, polybutadiene, polyisobutene and/or polyisopropene; and (v) a cationic flocculant, is formed or extruded as a rope, rod or sheet material shape or as a layer between a water barrier sheet or film barrier layer, e.g., a polymer sheet material or membrane layer, and a woven or non-woven geotextile sheet material fabric layer. The polymer sheet material layer would be disposed in contact with salt water and the copolymer is disposed adjacent to the polymer sheet material layer between the membrane and the fabric layers to perform the function of a safety layer to prevent the flow of salt water through the article if the polymer sheet material layer is defective or develops a crack or hole during installation or during use. Alternatively, the copolymer can be incorporated into the intersticies of the geotextile fabric layer to create a fabric/copolymer composite layer that serves as the safety layer attached to the membrane layer to prevent the flow of salt water through the article if the polymer sheet material layer is defective or develops a crack or hole during installation or during use.

The partially cross-linked acrylamide/partially neutralized acrylic acid copolymers, e.g., STOCKOSORB and/or STOCKOSORB S™ and/or STOCKOSORB F™ and/or acrylamide-potassium acrylate-acrylic acid copolymer, crosslinked (CAS#31212-13-2), have been found to have substantial free swell when contacted by high conductivity solutions, as described in this assignee's prior application, U.S. Pat. Publication No. 2009/0130368, the disclosure of which is hereby incorporated by reference in its entirety. Examples of tested high conductivity aqueous solutions are 1% NaCl (conductivity of 18 mS/cm) and synthetic seawater (4.5% sea salt; conductivity of 53.2 mS/cm). The partially cross-linked acrylamide/partially neutralized acrylic acid copolymers provide substantial free swells when in contact with aqueous solutions contaminated with any, or a combination of, $Ca^{2+}$, $Al^{3+}$ and other multivalent cations in combination with anions that are common in sea water and other wastewaters. To achieve the full advantage of the compositions, articles and methods described herein, the partially cross-linked acrylamide/partially neutralized acrylic acid copolymers used in the compositions and geocomposite articles described herein should have a free swell in 4.5% by weight salt water of at least 35 ml per 2 grams of copolymer, preferably at least about 40 ml/2 grams, more preferably at least about 50 ml/2 grams. Free swells are determined by sprinkling 2 grams of powdered copolymer into a 100 ml graduated cylinder and filling the cylinder to 100 ml with 4.5% by weight salt water. The volume of copolymer that settles to the bottom of the graduated cylinder is then measured and is the free swell.

The copolymers described herein are lightly cross-linked, i.e., have a crosslinking density of less than about 20%, preferably less than about 10%, and most preferably about 0.01% to about 7%. The crosslinking agent most preferably is used in an amount of less than about 7 wt %, and typically about 0.1 wt %, based on the total weight of monomers. Examples of crosslinking polyvinyl monomers include, but are not limited to, di, tri or other multi-functional acrylic, methacrylic, vinyl ether or acrylamido functional compounds that are well known in the art for cross-linking acrylate polymers. Moreover, the copolymers described herein are preferably water-insoluble.

Typical particles sizes for the crosslinked copolymer particles can be from 1 micron to approximately 4000 microns. Preferred particle sizes are less than 200 microns. Suitable copolymers sizes include:

Stockosorb F: 0-200 micron
Stockosorb S: 200-800 microns
Stockosorb M: 800-2000 microns
Stockosorb C: 2000-4000 microns
Stockosorb 400 RD: 100-800 microns The relative amounts of the acrylamide and partially neutralized acrylic acid in the salt water-waterproofing copolymers described herein can vary widely from about 1 mole % to about 99 mole % of each in the copolymer. Best results for achieving excellent free swells in salt water are achieved where acrylamide forms about 5% to about 95 mole % of the copolymer, preferably about 15% to about 85 mole %, more preferably about 55 mole % to about 75 mole %, and even more preferably about 60 mole % to about 70 mole %; sodium and/or potassium acrylate (preferable forms of the partially neutralized acrylic acid) is about 1 mol % to about 50 mole % of the copolymer, preferably about 5 mole % to about 25 mole % of the copolymer; and acrylic acid forms about 0.1 mole % to about 50 mole % of the copolymer, preferably about 1 mole % to about 10 mole % mole of the copolymer. One of ordinary skill in the art would recognize an equilibrium between the acrylate and acrylic acid forms of the units in the copolymer, and an equilibrium between any agent used to shift the equilibrium and the acrylate and acrylic acid units. Thereby the best description of the polymer chain is dependant on the mole percentage of acrylamide, which will not change dependant on the concentration of acids or bases in solutions of the polymer. Other material compositions that give a free swell of greater than about 35 mL/2 grams material in 4.5% sea salt in water are envisioned for this invention. Other monomers can be present in the copolymer including acrylic and methacrylic esters and acids, and substituted acrylamide and methacrylamides provided that the other monomers do not detract from the ability of the copolymer to absorb high conductivity water.

In accordance with the present invention, the compositions described herein can have a desired consistency ranging from a soupy liquid to a relatively stiff putty-like and tacky solid and having new and unexpected capacity for swelling in salt water.

In accordance with another important embodiment of the present invention, an upper sheet material layer may be applied over, and adhered to the compositions described herein to form laminated articles of manufacture. The upper sheet material layer can be water-impermeable to provide two water-proofing layers. The upper sheet material layer, under ideal conditions and proper installation will, by itself, prevent water or other liquids from penetrating the laminate. Frequently, however, it has been found that imperfect installation, particularly at seams, permits water or other liquid to penetrate a water impermeable layer intended for water proofing. Additionally, sometimes cracks or fissures develop in a "water-impermeable" sheet material permitting water penetration.

It has been found, quite unexpectedly, that the bentonite compositions of the present invention will expand to an unexpected volume upon salt water contact while maintaining structural integrity to permanently fill any cracks, fissures or gaps left from improper installation, thereby acting as an unexpectedly effective safety valve to insure that the laminate self heals to prevent essentially all liquid penetration to an earthen structure or building material thereunder.

The salt water-swellable compositions described herein are particularly effective when applied to building materials, such as wood, concrete, rock and the like, since the composition is tacky and readily adheres to solid, stable structures.

The optional water impermeable upper sheet material layer can be any flexible, water impermeable sheet material, such as polyvinyl chloride, a polyolefin, such as polyethylene or polypropylene and the like. Generally, the thickness of the water-impermeable sheet material is on the order of about 3 mm to about 50 mm. While a release paper or fabric layer is not essential to the laminates described herein, one or the other permits the laminate to be rolled upon itself and easily unrolled and applied.

The geotechnical fabrics are substituted for the release paper when the laminate is applied over an earthen surface for ease of application. The fabric is left in place on the undersurface of the composition sheet when the laminate is applied over an earthen surface so that the laminate sheets can be shifted in proper adjacent positions to provide effective sealing between laminate sheets. Any suitable fabrics can be used for this purpose, particularly since the fabrics have no water-impermeability purpose other than to achieve proper installation. Suitable fabrics include woven and non-woven permeable and non-permeable fabrics made from polypropylene, polyesters, nylon, propylene-ethylene copolymers, polypropylene-polyamide copolymers, and the like. The geotechnical fabrics are preferred for their bacteriological and chemical resistance. The thickness of the fabric is not important and such fabrics generally are available in thicknesses of 3 mm to about 30 mm.

To achieve the full advantage of the compositions and articles described herein, the composition should include a primary plasticizing and tackifying agent such as polydiene, polybutene, polypropene, polybutadiene, polyisobutene and/or polyisopropene in an amount of at least 0.5% by weight, preferably about 5% to about 20% by weight of the composition. Additional (secondary) tackifiers compatible with the polybutene, polypropene, polybutadiene, polyisobutene and/or polyisopropene may be included for additional tack so long as the secondary plasticizer is included in an amount of at least about 4% by weight preferably about 5% to about 20% by weight of the composition. Additional compatible tackifiers may include, for example, aliphatic petroleum hydrocarbon resins such as polyterpenes, hydrogenated resins, and mixed olefins. The compositions described herein may also include a secondary plasticizing agent such as one or more low polarity plasticizers, such as epoxidized soybean oil; blown castor oil; an alkyl monester, such as butyl oleate; a long chain partial ether ester, such as butyl cellosolve oleate; long chain alkyl diesters, such as dioctyl adipate and/or dioctylphthalate; and a petroleum-derived plasticizer such as an aromatic-napthenic oil, a napthenic-aromatic oil, a napthenic-paraffinic oil, and/or a paraffinic oil. Generally, aromatic tackifiers are not suitable without the primary plasticizer since they will bleed to the surface of the composition and separate thereby reducing the handleability and consistency of the composition. Other additives such as thickening agents, fillers, fluidizers, tackifiers and the like may be added in a total amount up to about 20 wt. % of the composition to impart any desired physical characteristics to the composition. However, it has been found that the addition of a silicic filler, e.g. silicic acid or calcium silicate, substantially decreases the water-swellability of the compositions of the present invention. Accordingly, essentially no silicic filler should be added to the composition. Silicic filler added in an amount of only 1 wt. % reduces the water swellability of the compositions by about 10%; and 5 wt. % added silicic filler reduces the water swellability by about 20%. To achieve the full advantage of the present invention, the silicic filler, if any, should be 1 wt. % or less.

Fluidizers such as petroleum distillates or evaporative solvents such as mineral spirits may be added to the composition of the present invention to aid in mixing, but it is preferred to combine the composition components without such solvents. In any case, the polydiene, e.g., polybutene, polypropene, polybutadiene, polyisobutene and/or polyisopropene should be present in the final composition, after evaporation of any solvents volatalizable under ambient conditions, in an amount of at least 0.5% by weight.

In accordance with an important feature of the compositions and articles described herein, no additives are necessary to protect the compositions of the present invention since the plasticizers such as polybutene, polypropene, polybutadiene, polyisobutene and/or polyisopropene ("polyolefins") will completely wet out the smectite clay/SAP blend, e.g., bentonite, in amounts up to about 90 wt. % bentonite/SAP blend without inhibiting the swelling characteristics of the bentonite. Quite unexpectedly, the polybutene, polypropene, polybutadiene, polyisobutene and/or polyisopropene component increases the capacity of the smectite clay to swell while providing sufficient tack so that the composition can be easily adhered to, substantially, any surface over extended periods of time.

The preferred clay utilized in the compositions and articles described herein can be either a sodium montmorillonite or calcium montmorillonite. In accordance with one important embodiment of the present invention, the smectite clay is bentonite. A preferred bentonite is calcium bentonite which is basically a non-water-swellable montmorillonite clay of the type generally found in the Black Hills region of South Dakota and Wyoming. This clay has calcium as a predominant exchange ion. However, the smectite, e.g., bentonite clay utilized in accordance with this embodiment of the present invention may also contain other cations such as sodium, potassium, magnesium and/or iron. There are cases wherein a montmorillonite predominant in calcium ions can be converted to a sodium variety through a well known process called "peptizing". The clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The clay, i.e., bentonite, generally is finely divided as known for use in water barrier panels and the like, preferably 70% of the clay passes through a #30 mesh sieve, more preferably 70% of the clay passes through a #50 mesh sieve, even more preferably 70% of the clay passes through a #100 mesh sieve, and still more preferably 70% of the clay passes through a #200 mesh sieve (ASTM D 422).

The polybutenes, or polyisobutylenes (hereinafter "polybutenes") used in accordance with the principles of the present invention, generally comprise $(C_4H_8)_n$ where n ranges from about 6 to about 45, straight chain or branched, having average molecular weights in the range of about 300 to about 2,500. The commercially available useful polybutenes are predominantly of higher molecular weight mono-olefins and can include 100% of the polybutene or include up to about 10% isoparaffins. The polybutenes are chemically stable, permanently fluid liquids and their tackiness increases with increased molecular weight. The viscosities of the polybutenes range from a consistency of a light oil to a highly viscous fluid having a viscosity range of about 25 to about 4,000 centipoises. The lower viscosity polybutenes can be combined with a water-swellable clay to provide a composition having a soupy consistency which is very tacky and difficult to handle depending upon the quantity of bentonite included within the composition of the present invention.

The polypropenes or polyisopropenes (hereinafter "polypropenes") useful in accordance with the principles of the present invention generally comprise $(C_3H_6)_m$ where m ranges from about 7 to about 60, straight chain or branched, having molecular weights in the range of about 300 to about 2,500. The commercially available polypropenes useful in accordance with the present invention generally are amorphous in character and may be combined with up to about 10 wt. % of a suitable processing solvent, such as ligroin, although the polypropenes may be blended with the bentonite easily at elevated temperatures i.e. 200° C. without a solvent.

The polydienes useful in accordance with the preferred embodiment of the present invention generally comprise either $(C_5H_8)_x$ or $(C_4H_6)_y$ or polymers formed combinations of both monomers where the total of both x and y monomers ranges from about 150 to about 1100. Examples of these materials include polybutadiene and polyisoprene, commonly referred to as liquid rubbers. The liquid rubbers can also comprise copolymers with other monomers such as styrene.

To achieve the greatest swelling of the compositions of the preferred embodiment, the polypropene, polydiene or polybutene or mixtures should be present in the composition in an amount of about 8 wt. % to about 30 wt. % of the total swellable composition.

The salt water swellable compositions described herein have a cationic coagulant or cationic flocculant included in an amount of about 5% to about 35% by weight of the swellable composition; preferably about 5% to about 30% by weight. Suitable cationic, polymeric flocculants/coagulants include polyquaternium-1 (CAS#: 68518-54-7); polyquaternium-2 (CAS#: 63451-27-1); polyquaternium-4 (copolymer of hydroxyethylcellulose and diallyldimethyl ammonium chloride); polyquaternium-5 (CAS#: 26006-22-4); polyquaternium-6 (polyallyldimethylammonium chloride; polydimethyldiallylammonium chloride; Magnafloc 370 (CAS#: 26062-79-3); polyquaternium-7 (CAS#: 26590-05-6); polyquaternium-8 (poly((methyl, stearyl)dimethylaminoethyl methacrylate), polyquaternium-9 (polydimethylaminoethylmethacrylate bromide); polyquaternium-10 (CAS#s: 53568-66-4, 55353-19-0, 54351-50-7, 81859-24-7; 68610-92-4, 81859-24-7); polyquaternium-11 (polyvinyl-N-ethyl-methylpyrrolidonium); poly(ethyldimethylammoniumethylmethacrylate) sulfate copolymer), polyquaternium-12 (CAS#: 68877-50-9); polyquaternium-13 (CAS#: 68877-47-4); polyquaternium-14 (CAS#: 27103-90-8); polyquaternium-15 (CAS#: 35429-19-7); polyquaternium-16 (quaternary ammonium salt of methyl-vinylimidazolium chloride and vinylpyrrolidone) (CAS#: 95144-24-4); polyquaternium-17 (adipic acid-dimethylaminopropylamine polymer (CAS#: 90624-75-2); polyquaternium-18 (azelaic acid, dimethylaminopropylamine, dicholorethylether polymer, CAS#: 113784-58-0); polyquaternium-19 (polyvinyl alcohol, 2,3-epoxypropylamine polymer (CAS#: 110736-85-1); polyquaternium-20 (polyvinyl octadecylether, 2,3-epoxypropylamine polymer (CAS#: 110736-86-2); polyquaternium-22 (CAS#: 53694-17-0); polyquaternium-24 (hydroxyethylcellulose, lauryl dimethylammonium epoxide polymer); polyquaternium-27 (copolymer of polyquaternium-2 and polyquaternium-17, CAS#: 131954-48-4); polyquaternium-28 (vinylpyrrolidone, dimethylaminopropylmethacrylamide copolymer, CAS#: 131954-48-8), polyquaternium-29 (chitosan, CAS#: 9012-76-4); propylene oxide polymer reacted with epichlorohydrin); polyquaternium-30 (methylmethacrylate, methyl(dimethylacetylammoniumethyl)acrylate copolymer, (CAS#: 147398-77-4); polyquaternium-33 (CAS#: 69418-26-4); poly(ethylene(dialkyl)ammonium) polymethacrylamidopropyltrimonium chloride (CAS#: 68039-13-4); and poly(2-acryloyloxyethyl)trimethylammonium).

Inorganic cationic flocculants such as aluminum salts can also be used as the cationic coagulant or cationic flocculant. Exemplary aluminum salt based flocculants include aluminum sulfate, sodium aluminate, magnesium aluminate, basic aluminum chloride (poly aluminum chloride) and the like, Preferably, the cationic coagulant or cationic flocculant is polydimethyldiallylammonium chloride (polyDADMAC). PolyDADMAC is sold under a variety of tradenames one of which is Magnafloc 370, available from CIBA. It is preferred that the intrinsic viscosity of the cationic polymer is generally at least about 0.2, preferably in the range of about 0.5 to 3, most preferably about 0.8 to 2.4 dl/g. Expressed in terms of molecular weight, it is preferred for the molecular weight to be below about 2 million, more preferably below about 1.5 million and, most preferably, below about 1 million, although it should generally be above about 100,000 and preferably above about 500,000.

Cationic coagulants or cationic flocculants, preferably, have a cationic atom content of at least 1 wt. %, more preferably at least 3 wt. %, still more preferably at least 5 wt. %, and even more preferably at least 7 wt. %. The cationic atom content is a measure of the total atomic weight of the atoms bearing cationic charge in/on the polymer chain divided by the molecular weight of the polymer, times 100, expressed as a weight percentage. By way of descriptive example, all of the cationic nitrogen atoms in the polymer poly(DADMAC) are quaternary ammonium ions, thereby the cationic atom content (here, the cationic nitrogen content) can be determined either by elemental analysis of a sample of the poly(DAD-MAC) or by the weight average molecular weight of the polymer. The elemental analysis would provide the weight percentage of nitrogen atoms in a sample of polymer, that is the cationic atom content. PolyDADMAC has a cationic atom content of approximately 8.7 wt. %.

In accordance with another important feature of the present invention, it has been found that the addition of an elastomer in an amount of about 1 wt. % to about 20 wt. % based on the total weight of the swellable composition will substantially increase the handleability of the composition without reducing the sealing capability of the material. To achieve the full advantage of this embodiment of the present invention, the elastomer should be included in an amount of about 2 wt. % to about 10 wt. % based on the total weight of the composition. Surprisingly, it has been found that mastication or shearing, i.e. in a sigma blender, of a composition containing a water-swellable clay, such as bentonite, polypropene and/or polydiene and/or polybutene, and an elastomer, actually increases the capacity of the composition to swell and retain good cohesion.

Essentially any elastomer having at least 100% elongation and, in accordance with an important feature of the present invention having at least 500% elongation, can be used in the bentonite composition of the present invention to substantially improve the handleability, cohesiveness and structural integrity of the composition and articles manufactured. Partially cross-linked elastomers have been found to be most suitable in improving the consistency, handleability and structural integrity of articles requiring such properties, but elastomers which are not cross-linked are also useful, particularly those polymers which are capable of being lightly cross-linked when subjected to the heat generated within the blender, i.e. sigma blender, during mastication and mixing with the other composition components. Useful non-cross linked elastomers can include styrene block copolymers (S-TPE), polyester block copolymer (COPE), polyurethanes (TPE), polyether block amides (PEBA), and newer technologies such as ethylene or propylene-based copolymers known as polyolefin elastomers (POE) and polyolefin plastomers (POP). Fully cross-linked elastomers generally are not suitable for incorporation into the compositions of the present invention since their elongation capacity is insufficient to permit full expansion of the bentonite during hydration. However, any elastomer having at least 100% elongation is suitable and included within the scope of the present invention.

To achieve the full advantage of the compositions and articles described herein, the elastomers should have an elongation of at least 500% to allow for the new and unexpected bentonite swelling discovered in accordance with the principles of the embodiment of the invention directed to intimately contacting bentonite with polypropylene, polydiene and/or polybutene. Additional suitable elastomers for incorporation into the composition include elastomeric resins selected from the group consisting of but not limited to attactic polypropylene; ethylene-propylene copolymers; ethylene-butene copolymers; ethylene-hexene copolymers; ethylene-octene copolymers; ethylene-co-vinyl acetate copolymers; a terpolymer of ethylene, propylene, and a non-conjugated diene (EPDM); a copolymer of ethylene and vinyl acetate; a copolymer of ethylene and methacrylate; thermoplastic urethane; thermoplastic vulcanizate; thermoplastic polyesters; a styrene-butadiene copolymer; chlorinated polyethylene; cholorsulfonated polyethylene; nitrile rubber (NBR); synthetic and natural rubbers, halogenated butyl rubber, and partially cross-linked butyl rubbers having divinylbenzene added to form a terpolymer for the purpose of imparting a degree of "cure." The elastomer can be shredded prior to mastication with the bentonite and polypropenes and/or polybutenes to decrease mixing time although shredding is not necessary. Mastication and homogeneous flow of the elastomer throughout the bentonite composition can be achieved with the elastomer in any desired shape, i.e., pellet form, for example in a sigma blender.

In accordance with another important feature of the compositions and articles described herein, the bentonite compositions disclosed herein can include additives capable of forming a skin on the composition, such as a copolymer of vinyl toluene with a vegetable drying oil. The compositions containing skins are useful wherever the composition does not require tackiness for securing the composition to its intended location. If tackiness is desired, a surface coating of any suitable tackifier may be applied over the skin.

In accordance with still another important embodiment of the compositions and articles described herein, a water-swellable composition is provided including a water-swellable clay, such as bentonite, in an amount of about 35 wt. % to about 90 wt. %, an elastomer in an amount of about 1 wt. % to about 20 wt. %, and any plasticizer compatible with the elastomer and capable of plasticizing the elastomer, in an amount of about 8 wt. % to about 50 wt. % based on the total weight of the composition.

To achieve the full advantage of the compositions, articles and methods described herein, the composition should be flexible, e.g., when in rope form, it should be capable of being rolled upon itself for convenient unrolling into position, for example, between two adjacent concrete sections and for wrapping around conduits; the composition should have a percent swell in high salinity (4.5% by weight sea salt) water of at least 100% (at least 100% weight gain[1]); and the composition should be water-impermeable to high salinity water, that is the high salinity water should penetrate the composition at a rate of $1 \times 10^{-7}$ cm/sec or less, preferably at a rate of $5 \times 10^{-9}$ cm/sec or less as measured by ASTM D 5887.

Further, in order to achieve the full advantage, the anionic, water-insoluble acrylic copolymer/cationic polymer molar ratio should be in the range of about (0.25 to 4)/1, preferably about (0.5 to 2)/1, more preferably about (2 to 3)/2, most preferably 3/2. The cationic polymer appears to ionically interact with negative charge sites on the smectite clay and, thereby maintains the composition in a cohesive form and in proper position, where initially disposed, during swelling. However, unexpectedly, these interactions are maintained in the presence of the high electrolyte contents of high salinity salt water.

If a less viscous composition, e.g., a paste consistency, is desired in order to penetrate smaller voids and crevices, the composition can include additional polybutene, polydiene, polypropene, or other oils, e.g., in amounts of about 18 wt. % to about 35 wt. %, based on the total weight of the composition, while maintaining the clay at about 40 wt. % to about 45 wt. %, copolymer at about 9 wt. % to about 15 wt. %, and the cationic flocculant at about 14 wt. % to about 20 wt. % of the composition.

Suitable amounts and ratios of components achieve cohesiveness; high swell; and prevent disintegration during and after swelling. For example:

Preferred Extruded Composition Ranges $$\frac{\text{hydrated weight} - \text{dry weight}}{\text{dry weight}} \times 100 = \geq 100\% \qquad 1$$

| Component | Name | Units | Low | High |
|---|---|---|---|---|
| smectite clay | Clay | % | 40 | 49 |
| partially cross-linked acrylamide/partially neutralized acrylic acid copolymer | Stockosorb F | % | 9 | 21 |
| cationic flocculant | Magnafloc 370 | % | 14 | 27 |
| elastomer | butyl rubber | % | 5 | 9 |
| polybutene/polypropene | polyisobutylene | % | 11 | 17 |

Intactness was measured by a cohesion test. Approximately 80 grams of a salt water swellable composition was allowed to hydrate until the equilibrium swell extent was achieved, which usually occurred after one to two weeks of hydration time. The swollen sample was dropped from a height of 16 inches onto a sieve with a 9.5 millimeter opening and a wire mesh diameter of 0.34 millimeters. The percent cohesion of the sample was determined by dividing the mass of the sample caught by the screen by the mass of the sample prior to dropping and multiplying by 100. Samples where 75 to 100% of the mass was retained on the screen were given a rating of 4. Samples where 50 to 74% of the mass was retained on the screen were given a rating of 3. Samples where 25 to 49% of the mass was retained on the screen were given a rating of 2. Samples retaining less than 25% of the mass on the screen were given a rating of 1.

A plasticizer for the elastomer is an optional additive for the composition described herein. The plasticizer improves the workability of the elastomer, extends the elastomer, enables the elastomer to reposition itself with expansion of the water swellable clay when the clay is wetted and wets the clay surface sufficiently to enable the elastomer to accept substantial amounts of clay (up to about 90 wt. %) and to provide a homogeneous clay distribution throughout the elastomer.

It has been found that an elastomer having an elongation of at least 100% will permit the clay to substantially expand so long as the elastomer includes at least one plasticizer in an amount of at least 8 wt. % based on the total weight of the composition. The elastomer provides exceptionally good structural integrity to the composition without substantially inhibiting the swellability of the clay. The elastomers should be partially, but not completely, cross-linked and include, for example, butyl rubber, styrene-butadiene, other synthetic and natural rubbers, ethylene-propylene copolymers, ethylene and propylene terpolymers.

Other suitable plasticizers are the relatively low polarity plasticizers including epoxidized oils, such as epoxidized soybean oil; blown castor oil; alkyl monesters such as butyl oleate; long chain partial ether esters, such as butyl cellosolve oleate; long chain alkyl diesters, such as dioctyl adipate and dioctylphthalate; and petroleum-derived plasticizers such as aromatic-napthenic oils; napthenic-aromatic oils; napthenic-paraffinic oils; and paraffinic oil.

To achieve the full advantage of this embodiment of the compositions and articles described herein, the plasticizer should be included in the composition in an amount of at least 10 wt. % of the composition to plasticize the elastomer and fully wet-out the bentonite. The plasticizers generally are included in an amount of about 15 wt. % to about 30 wt. %.

Turning now to the drawing, and initially to FIGS. 8A-8E, an apparatus is illustrated in schematic form for extruding the

| | Examples and Results | | | | | | | |
|---|---|---|---|---|---|---|---|---|
| # | Calcium Bentonite Clay % | Stockosorb F % | Magnafloc 370 % | Butyl Rubber % | Polyiso-butylene % | 168 hr Seawater Swell % Capacity | Seawater Intactness Rating (4 = best) | 168 hr DI Water Swell % Water Capacity | DI Intactness Rating (4 = best) |
| 1 | 40 | 10.1 | 26.6 | 6.5 | 16.8 | 213 | 4 | 172 | 4 |
| 2 | 40 | 13.4 | 26.6 | 8.8 | 11.2 | 638 | 1 | 161 | 4 |
| 3 | 40 | 13.4 | 26.6 | 8.8 | 11.2 | 503 | 1 | 133 | 4 |
| 4 | 40 | 14.4 | 26.6 | 5 | 14 | 570 | 2 | 180 | 4 |
| 5 | 40 | 16.2 | 22 | 5 | 16.8 | 413 | 3 | 149 | 4 |
| 6 | 40 | 20.8 | 13.6 | 8.8 | 16.8 | 352 | 3.5 | 626 | 3.5 |
| 7 | 40 | 20.8 | 13.6 | 8.8 | 16.8 | 568 | 1.5 | 508 | 4 |
| 8 | 40 | 20.8 | 23 | 5 | 11.2 | 951 | 1 | — | — |
| 9 | 43.8 | 20.8 | 13.6 | 5 | 16.8 | 1015 | 1 | — | — |
| 10 | 44.3 | 8.6 | 21.5 | 8.8 | 16.8 | 147 | 4 | 140 | 4 |
| 11 | 44.3 | 14.7 | 20.1 | 6.9 | 14 | 528 | 2.5 | 159 | 4 |
| 12 | 44.3 | 14.7 | 20.1 | 6.9 | 14 | 484 | 2.5 | 149 | 4 |
| 13 | 44.3 | 16.5 | 13.6 | 8.8 | 16.8 | 437 | 4 | 421 | 3.5 |
| 14 | 44.3 | 20.8 | 18.7 | 5 | 11.2 | 981 | 1 | — | — |
| 15 | 45.6 | 20.8 | 13.6 | 88 | 11.2 | 521 | 4 | 705 | 3.5 |
| 16 | 48.6 | 8.6 | 21 | 5 | 16.8 | 372 | 3.5 | 139 | 4 |
| 17 | 48.6 | 8.6 | 22.8 | 8.8 | 11.2 | 292 | 4 | 124 | 4 |
| 18 | 48.6 | 8.6 | 26.6 | 5 | 11.2 | 566 | 1 | 388 | 1 |
| 19 | 48.6 | 12.2 | 13.6 | 8.8 | 16.8 | 354 | 4 | 198 | 4 |
| 20 | 48.6 | 14.7 | 20.5 | 5 | 11.2 | 654 | 1 | 281 | 2 |
| 21 | 48.6 | 20.8 | 13.6 | 5 | 12 | 1022 | 1 | 990 | 1 | compositions described herein into rod and sheet forms, as disclosed in U.S. Pat. No. 4,534,925, the disclosure of which is incorporated herein by reference in its entirety. The composition 12 comprising an intimate mixture of a smectite clay; with polypropene and/or polydiene and/or polybutene; partially cross-linked acrylamide/partially neutralized acrylic acid copolymer; and cationic flocculant, is thoroughly blended in a homogeneous blend with an elastomer, such as butyl rubber, in sigma blender 14 to fully masticate the elastomer to provide a homogeneous clay composition into extruder 16. Auger 18 of extruder 16 forces the bentonite composition through a die opening 20 of any desired shape, for example the rod form shown in FIG. 8B, to form a rectangular rope 22. The rope 22 is directed onto a conveyor 24 capable of being driven at a variety of predetermined speeds by conveyor motor 26. By varying the speed of the conveyor 24 relative to the speed at which the extruded rope 22 exits the die opening 20, the rope can be stretched or compressed slightly to vary the dimensions of the extruded clay composition. The conveyor 24 includes a suitable conveyor belt 28 and a continuous supply of release paper 30 directed over the conveyor belt 28 for contact against a surface of the rope 22 being extruded through the die opening 20 of extruder 16. The rope 22 on the release paper 30 is wound around a take up roller 32 as the rope is extruded onto the release paper to provide the composition in a coiled, rope-like form.

Figure 8:
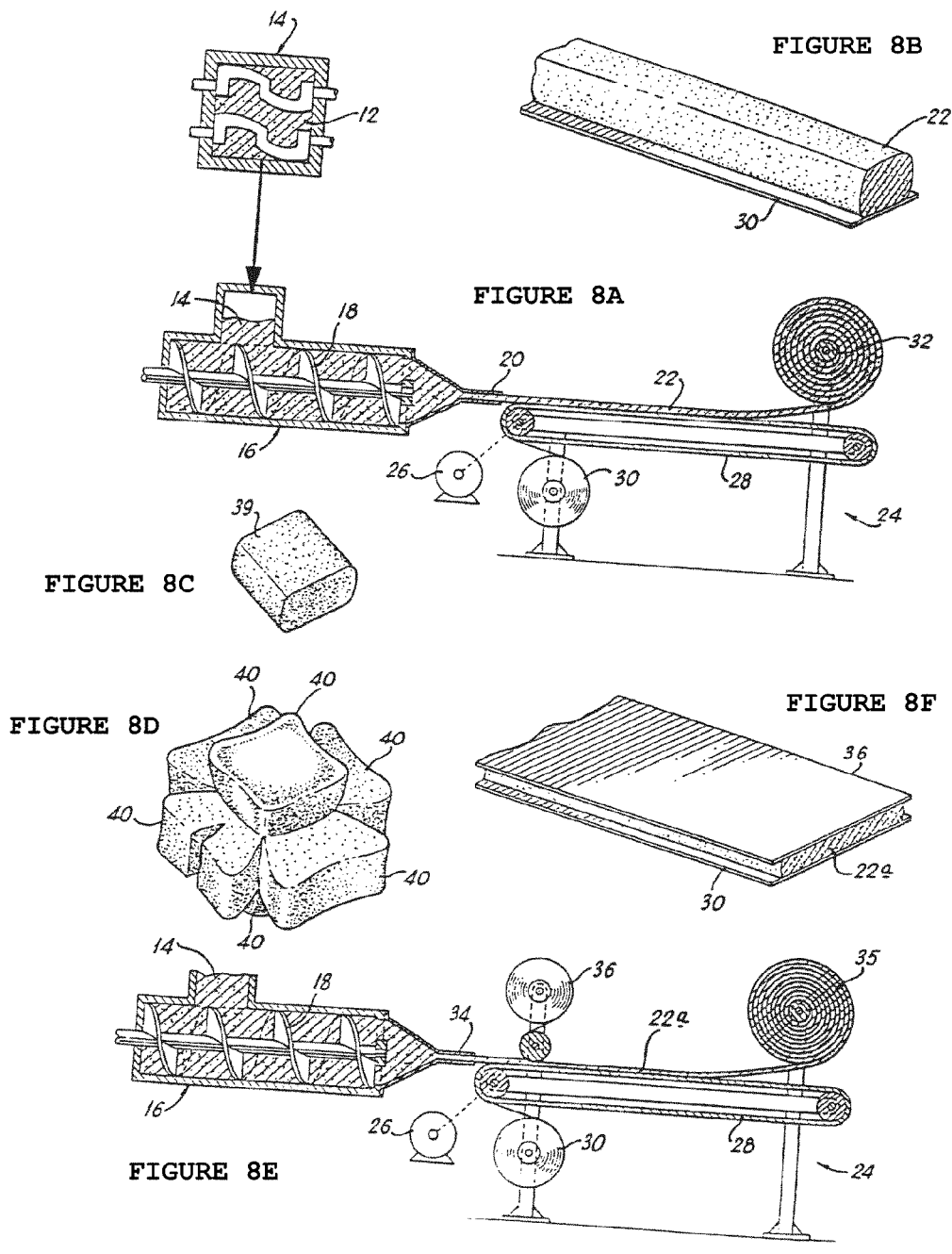
FIGS. 8A-8F illustrate examples of salt-water swellable materials and methods of manufacture, in accordance with an embodiment of the disclosure.
Figure 9:
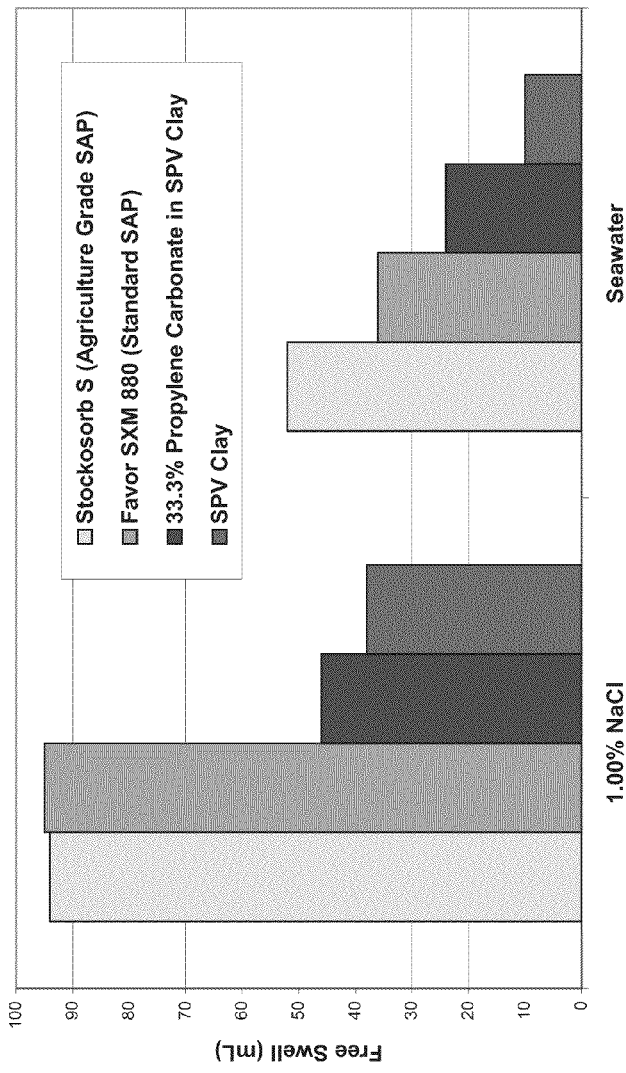
FIG. 9 is a graph illustrate the SAP welling in salt water of hydraulic barrier in accordance with an embodiment of the disclosure.
Figure 10:
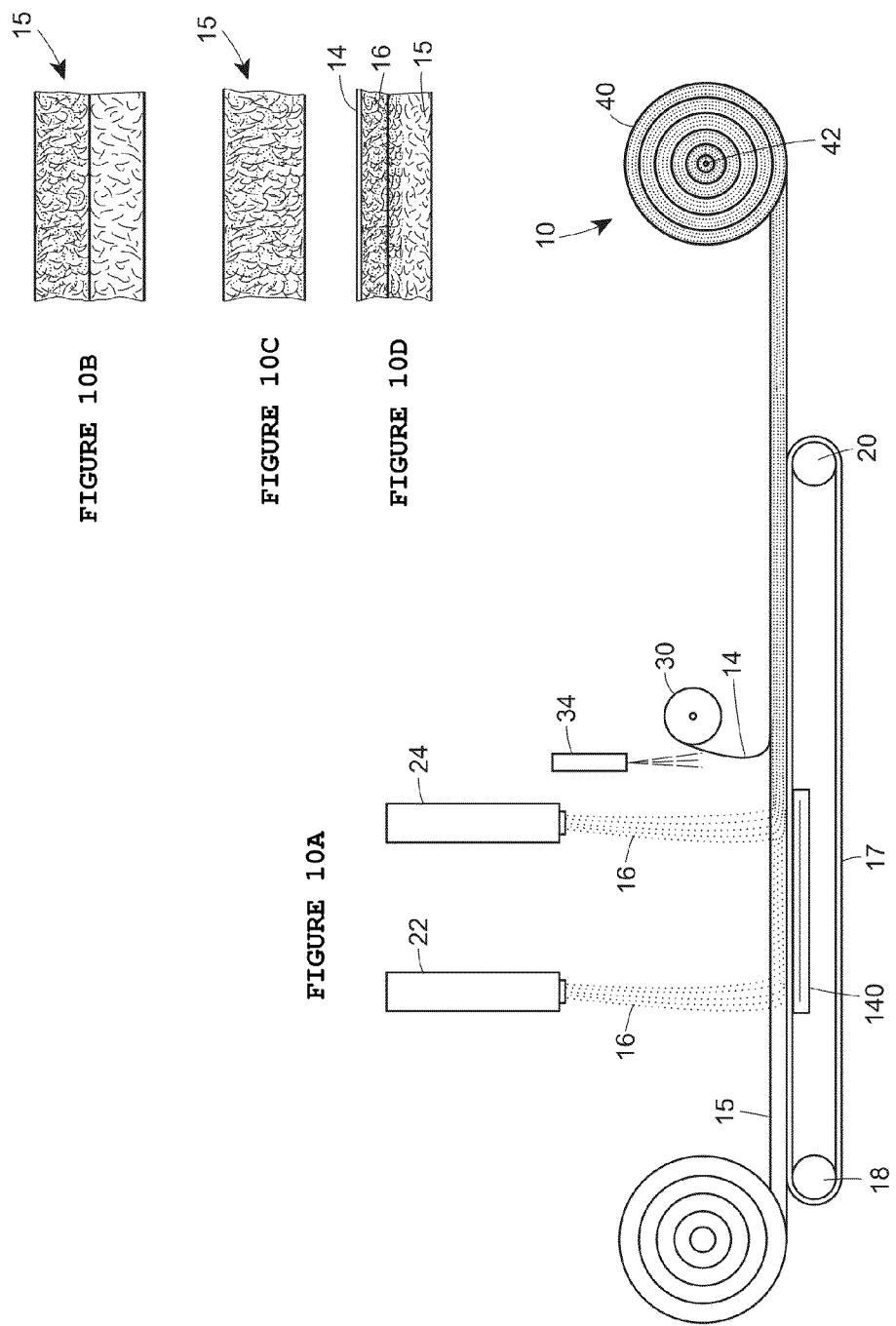
FIG. 10A is a schematic drawing illustrating an apparatus and method of manufacturing a hydraulic barrier in accordance with an embodiment of the disclosure.
FIGS. 10B-10D are cross-sectional images of the hydraulic barrier at different points of the method of manufacturing illustrated in FIG. 10A.

Similarly, as shown in FIG. 8E, the extruder 16 can include an elongated die opening 34 to provide the composition in sheet form 22a, as shown in FIG. 8F, and the sheets may be cut to length at a suitable cutting station (not shown) or formed into a sheet coil 35 as shown in FIG. 8E. As shown in FIG. 8E, the conveyor may include a second continuous supply of release paper 36 to sandwich the bentonite sheet between upper and lower release sheets. The second release paper supply 36 is particularly desirable for compositions not including an elastomer and compositions having less cohesiveness and structural integrity. In one embodiment, a water-soluble film is applied to one major surface, as manufactured and applied in accordance with this assignee's U.S. Pat. No. 5,580,630, the disclosure of which is hereby incorporated by reference in its entirety.

FIGS. 8C and 8D show a portion of the rope 22 of FIG. 8B comprising a smectite clay, e.g., sodium or calcium bentonite, polypropene and/or polydiene and/or polybutene, partially cross-linked acrylamide/partially neutralized acrylic acid copolymer, cationic flocculant, and an elastomer before and after hydration. The relatively rectangular three-dimensional block 39 of FIG. 8C, when hydrated with salt water, reproduced itself outwardly along every surface resulting in a central core or block having the approximate dimensions as shown in FIG. 8C, surrounded by six additional blocks 40 having approximately the same dimensions. This capacity for the compositions described herein to maintain their capacity to swell outwardly from every surface is particularly useful where the composition includes the elastomeric material. An elastomeric material having at least 100% elongation is capable of stretching to flow with the expanding clay and copolymer to form surrounding, individual swollen bentonite/copolymer structures having relatively good structural integrity capable of entering any given fissures or other structural damage to seal a potential water seepage path.

It was concluded that the smectite clays should be contained in the compositions, preferably in amounts of about 40 wt. % to about 50 wt. %; the partially cross-linked acrylamide/partially neutralized acrylic acid copolymer, preferably in an amount of about 10 wt. % to about 20 wt. %; the cationic flocculant, preferably in an amount of about 5% to about 35%, more preferably about 15 wt. % to about 30 wt. %; the elastomer, preferably in an amount of about 5 wt. % to about 10 wt. %; and polybutene (or polyisobutylene) and/or polypropene (or polyisopropene), and/or polydiene, preferably in an amount of about 8 wt. % to about 17 wt. %; based on the total weight of the extrudable composition. It should be noted that clay contents of 45-50 wt. %, and higher percentages of cationic flocculant, e.g., 15-20 wt. %, together with higher percentages of elastomer, increases the intactness of the extruded compositions. Increased swell is promoted at the higher percentages of partially cross-linked acrylamide/partially neutralized acrylic acid copolymer, e.g., 15 wt. % to 20 wt. %, lower percentages of cationic flocculant, e.g., 5 wt. % to 27 wt. %, and lower percentages of smectite clay, e.g., calcium bentonite, e.g., 45 wt. % to about 50 wt. %, based on the total weight of the composition.

Salt-Water—Self-Healing Hydraulic Barrier

EXAMPLE 2

The Following Reference Numbers Correspond to FIG. 9-12

Conductivity is a measure of the level of ion concentration of a solution. The more salts, acids or bases are dissociated, the greater the conductivity of the solution. In water or wastewater it is mainly a matter of the ions of dissolved salts, and consequently the conductivity is an index of the salt load in wastewater. The measurement of conductivity is generally expressed in S/cm (or mS/cm) which is the product of the conductance of the test solution and the geometric factor of the measuring cell. For purposes of this invention, high conductivity waters are defined as waters with conductivity greater than 1 mS/cm. Conductivity can be measured using a variety of commercially available test instruments such as the Waterproof PC 300 hand-held meter made by Eutech Instruments/Oakton Instruments.

In the preferred embodiment, the partially cross-linked acrylamide/acrylate/acrylic acid copolymer is incorporated as a layer between a water barrier sheet or film barrier layer, preferably a polymer sheet material or membrane layer, and a woven or non-woven geotextile sheet material fabric layer. The polymer sheet material layer would be disposed in contact with the high conductivity water and the copolymer is disposed adjacent to the polymer sheet material layer between the membrane and the fabric layers to perform the function of a safety layer to prevent the flow of high conductivity water through the article if the polymer sheet material layer is defective or develops a crack or hole during installation or during use. Alternatively, the copolymer can be incorporated into the intersticies of the geotextile fabric layer to create a fabric/copolymer composite layer that serves as the safety layer attached to the membrane layer to prevent the flow of high conductivity water through the article if the polymer sheet material layer is defective or develops a crack or hole during installation or during use.

The partially cross-linked acrylamide/partially neutralized acrylic acid copolymers, e.g., STOCKOSORB™ and/or STOCKOSORB S™, have been found to have substantial free swell when contacted by high conductivity solutions. Examples of tested high conductivity aqueous solutions are 1% NaCl (conductivity of 18 mS/cm) and synthetic seawater (4.5% sea salt; conductivity of 53.2 mS/cm). The partially cross-linked acrylamide/partially neutralized acrylic acid copolymers provide substantial free swells when in contact with aqueous solutions contaminated with any, or a combination of, $Na^+$, $Ca^{++}$, $Mg^+$, $Al^{+++}$ and other multivalent cations in combination with anions that are common in sea water and other wastewaters. To achieve the full advantage of the geocomposite articles and methods described herein, the partially cross-linked acrylamide/acrylate/acrylic acid copolymers used in the geocomposite articles should have a free swell in 4.5% salt water of at least 35 ml per 2 grams of copolymer, preferably at least about 40 ml/2 grams, more preferably at least about 50 ml/2 grams. Free swells are determined by sprinkling 2 grams of powdered copolymer into a 100 ml graduated cylinder and filling the cylinder to 100 ml with 4.5% salt water. The volume of copolymer that settles to the bottom of the graduated cylinder is then measured and is the free swell.

In the preferred embodiment, described herein are multi-layer articles of manufacture that are salt water barrier geocomposite mats, and their method of manufacture. In the preferred embodiment, the geocomposite mat includes a preformed woven or non-woven geotextile fabric material, having a thickness of about 0.5 mm to about 200 mm, preferably about 1 mm to about 100 mm, having a layer of powdered or granular partially cross-linked acrylamide/partially neutralized acrylic acid copolymer, either in at least an upper portion of its thickness across its entire major surface, or provided in a separate layer on the geotextile sheet or fabric material. In the preferred embodiment, the powdered or granular copolymer is at least partially disposed within the pores of the geotextile fabric or mat material to surround the upper fibers, e.g., by vacuum suction, by vibrating during deposition of the copolymer thereon to allow the powdered or granular copolymer to flow by gravity and vibrational forces into the pores of the geotextile sheet or mat, or simply by virtue of being sized to be received within the pores of the contacting surface of the woven or non-woven (preferably non-woven) geotextile fabric or mat.

In the preferred embodiment, a liquid-impermeable cover sheet (membrane layer) is adhered to the upper major surface of the copolymer-containing geotextile fabric or mat to prevent the powdered or granular copolymer from escaping from the geotextile sheet or mat during transportation and installation, and to provide a primary water-impermeable layer to the article. Optionally, the edges of the copolymer-containing geotextile sheet or mat can be sealed, such as by providing the upper water-impermeable cover sheet slightly larger than the dimensions of the geotextile sheet or mat and gluing or otherwise adhering the extra cover sheet material to the edges of the copolymer-containing geotextile, such as by heat sealing them together. Other edge sealing options include sewing, needlepunching, and ultrasonic welding of the cover sheet to the edge of the geotextile sheet or mat, or by applying a separate, edge-covering material that can be glued, heat sealed or ultrasonically welded to the water-impermeable cover sheet and/or to the geotextile sheet or mat. Edge sealing materials preferably are liquid-impermeable.

In addition to the layer of partially cross-linked acrylamide/partially neutralized acrylic acid copolymer, powdered or granular materials can be admixed with the copolymer or can be applied as a separate layer. The additional powdered or granular materials include water-swellable sodium smectite clay, organophilic clay, activated carbon, coke breeze, zero-valent iron, apatite, zeolite, peat moss, polymeric ion exchange resins, polymeric adsorbents and mixtures thereof. Preferably, the copolymer is disposed adjacent to the water-impermeable sheet or film barrier layer, and also may contain other materials, admixed therewith in an amount up to about 80% by weight of the mixture.

The method of manufacture permits the manufacture of a geocomposite article that includes the partially cross-linked acrylamide/acrylate/acrylic acid copolymer that is structurally secure, without substantial lateral movement, and contains the swelling material either as a discrete layer between the impermeable sheet and the geotextile, uniformly distributed throughout the geotextile, or distributed as a gradient throughout the geocomposite article. The multi-layer geocomposite article can be manufactured to provide either a flexible or a rigid geocomposite article, and permits the manufacture of various modified geocomposite articles that include the salt water barrier swelling copolymer in addition to a zeolite or an organophilic clay with or without a sodium smectite water-absorbent material; the application of layer(s) of liquid-impermeable films or sheets of material over not only one, but over both major surfaces of the geocomposite article to confine the granular or powdered copolymer material in place within the geotextile sheet or mat; the application of solid or liquid adhesive materials or compositions to glue a major undersurface of the barrier layer to the copolymer or to the geotextile sheet material containing the copolymer for complete retention. The materials can be bonded together either mechanically (sewing, needlepunching or gluing), chemically, or physically (i.e., melting, or the like). The structure can be strengthened or reinforced by inserting one or more rigidifying materials into, or onto, the geocomposite article during manufacture, such as a sheet of perforated fiberglass; rope; cardboard; relatively rigid, liquid-permeable corrugated materials, e.g., corrugated cardboard, and the like at some point at or between the top and bottom major surfaces of the geocomposite article to provide various degrees of flexibility or rigidity; the capability of manufacturing the geocomposite articles without the necessity of a consolidation step; and providing various sizes, shapes and weights of geotextiles to achieve the benefits of each.

The copolymers described herein are lightly cross-linked, i.e., have a crosslinking density of less than about 20%, preferably less than about 10%, and most preferably about 0.01% to about 7%. The crosslinking agent most preferably is used in an amount of less than about 7 wt %, and typically about 0.1 wt %, based on the total weight of monomers. Examples of crosslinking polyvinyl monomers include, but are not limited to, di, tri or other multi-functional acrylic, methacrylic, vinyl ether or acrylamido functional compounds that are well known in the art.

The relative amounts of the acrylamide; acrylate; and acrylic acid in the salt water-waterproofing copolymers described herein can vary widely from about 1 mole percent to about 99 mole percent of each in the copolymer. Best results for achieving excellent free swells in high conductivity water are achieved where acrylamide forms about 5% to about 90 mole % of the copolymer, preferably about 15% to about 60 mole %; sodium and/or potassium acrylate forms about 2% to about 50% mole % of the copolymer, preferably about 5% to about 25 mole % of the copolymer; and acrylic acid forms about 2% to about 50% of the copolymer, preferably about 1% to about 10% mole of the copolymer. Other material compositions that give a free swell of greater than about 35 mL/2 grams material in 4.5% sea salt in water are envisioned for this invention. Other monomers can be present in the copolymer including acrylic and methacrylic esters and acids, and substituted acrylamide and methacrylamides provided that the other monomers do not detract from the ability of the copolymer to absorb high conductivity water.

Figure 11:
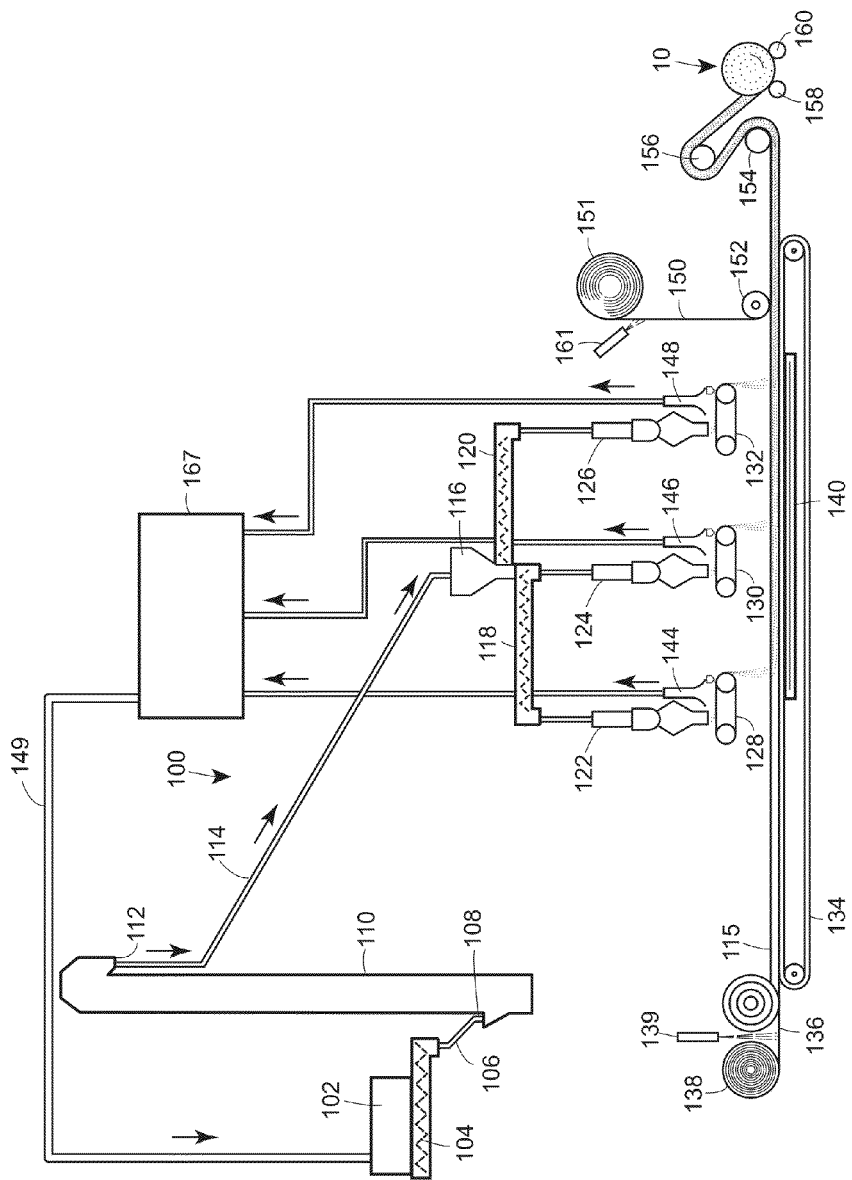
FIG. 11 is a schematic drawing illustrating an apparatus and method of manufacturing a hydraulic barrier in accordance with an embodiment of the disclosure.

As shown in FIGS. 10A and 11, there is illustrated a method and apparatus, including a number of optional features each of which can be used alone or in combination with any of the other features for manufacturing a product having only a partially cross-linked acrylamide/acrylate/acrylic acid powdered or granular material therein, or a plurality of different granular or powdered materials, including the copolymer, and with or without various reinforcing materials and/or coating materials added to one or both exterior surfaces of the article being manufactured to provide various characteristics or properties to the finished salt water geocomposite barrier articles 10, as will be described in more detail hereinafter. The apparatus generally includes a conveyor belt 17 that travels continuously around a pair of rollers 18 and 20, at least one of which is motor driven at a desired speed; and one or more powdered or granular material feeding devices, generally designated by reference numerals 22 and 24.

A liquid-impermeable sheet material layer 14, used to provide a primary salt water barrier sheet is applied to an upper major surface of a pre-formed, geotextile sheet or mat 15 after loading the geotextile sheet or mat 15 with the a partially cross-linked acrylamide/acrylate/acrylic acid copolymer 16 from one or both feeding devices 22 and/or 24. In one embodiment, the powdered or granular copolymer 16 penetrates the geotextile sheet or mat 15 by vibrating the geotextile 15 with vibrator 140. Alternatively, vacuum can be applied under the geotextile sheet or mat 15. Alternatively, the copolymer 16 minimally penetrates into an upper surface of the geotextile sheet or mat 15 to form a distinct copolymer layer disposed between the geotextile sheet or mat 15 and the primary waterproofing barrier layer 14.

Additional granular or powdered materials can be applied to the geotextile sheet or mat 15 from feeding conduits 22 or 24 to provide one or more surface concentrations of copolymer 16 or to apply a different powdered or granular material, prior to applying the water-impermeable cover layers 14. The primary barrier layer 14 preferably is adhered to the upper major surface of the copolymer-containing geotextile sheet or mat 15 using a water-insoluble adhesive, applied from adhesive supply vessel 34. Other nonlimiting methods of introduction of the copolymer into the composite structure can be envisioned. Alternative methods could include: the coating or spraying of a paste or dispersion of the copolymer onto the sheet via extrusion or roll coating; preassembling a copolymer/fabric composite to be later combined with a water-impermeable layer to form the final composite; or other methods to achieve the desired structure.

FIG. 10B shows at geotextile sheet or mat 15 filled only on an upper major surface with the powdered or granular copolymer material 16. FIG. 10C shows the geotextile sheet or mat 15 filled with the copolymer 16 incorporated throughout the geotextile sheet or mat 15. FIG. 10D shows the partially embedding of the copolymer 16 into an upper surface of the geotextile (preferably non-woven) sheet or mat 15, a distinct intermediate layer of copolymer, and an adhesively secured upper, primary, water-impermeable sheet material layer 14. Other layers of material could be envisioned to assist in improvement of the mechanical strength of the composite, to assist with the containment of the copolymer in the structure, or improve the bonding of the different layers of the structure.

Turning now to FIG. 11, there is shown a schematic diagram of one method of loading the pre-formed, high loft geotextile mat 115 with powdered or granular copolymer in a dry state. The dry material feeding apparatus, generally designated by reference numeral 100 is useful for depositing the partially cross-linked acrylamide/acrylate/acrylic acid copolymer, with or without other powdered or granular materials, such as an organophillic clay or other materials, from a receiving hopper 102. An auger 104 is disposed at a lower end of the receiving hopper 102, and in fluid communication therewith, to force the copolymer material through conduit 106 to an inlet 108 of elevator 110. The copolymer is discharged from the elevator 110 at elevator outlet opening 112, through conduit 114 into a receiving hopper 116. A pair of augers 118 and 120 in fluid communication with a lower portion of hopper 116 force the copolymer into one, two or three feeding mechanisms, generally designated by reference numerals 122, 124 and 126, for feeding the copolymer in a controlled manner to one, two or three continuous feed conveyor belts 128, 130 and 132 successively aligned above an elongated product conveyor belt 134.

The copolymer generally is applied over the geotextile sheet or mat 115 in an amount of about 0.1 ounce to 3 pounds of powdered or granular copolymer per square foot of finished article major surface area, preferably about 0.1 ounce to about 5 pounds of powdered or granular copolymer per square foot of article major surface area. In accordance with one embodiment, a supply of a liquid-impermeable flexible sheet material 136 in roll form 138 may be disposed above the continuous product conveyor belt 134 to provide a continuous supply of liquid-impermeable flexible sheet material onto an upper surface of the product conveyor belt 134. The upper surface of sheet material 136 from roll 138 may be sprayed with liquid adhesive from adhesive vessel 139 to adhere the sheet material to an undersurface of the geotextile sheet or mat 115, and the powdered or granular copolymer then is deposited onto the geotextile sheet or mat 115 from one, two or all three of the feed conveyor belts 128, 130 and 132. Any one, two or all three of the feed conveyor belts 228, 230 and 232 can be used to incorporate the same or different powdered or granular materials throughout a portion of, or the entire thickness of the geotextile sheet or mat 115. Vibration apparatus 140 may be connected to the product conveyor belt directly below the feed conveyor belts 128, 130, and 132 to vibrate the powdered or granular contaminant-reactant materials into the geotextile sheet or mat 115.

The powdered or granular copolymer is deposited across the entire width of the geotextile sheet or mat 115, as the particles drop from the feeders 122, 124 and/or 126. In this manner, the entire thickness or any portion of the thickness of the fibrous mat 115 may be filled with the copolymer. Dust collection suction devices 144, 146 and 148 may be disposed near each continuous feed conveyor belt 128, 130 and 132 to clear the air of fine particles emanating from feeding mechanisms 122, 124 and 126 and return the particles back to a dust collector 167 for disposal and/or back to the receiving hopper 102, via conduit 149. A second flexible, water-impermeable sheet material 150, from roll 151, is disposed on a downstream side of the copolymer feeding mechanisms 122, 124, and 126 and above the product conveyor belt 134. The second flexible sheet material 150 is fed by power driven roller 152, power rollers 154 and 156 and wind up rollers 158 and 160 to dispose a flexible, water-impermeable sheet material 150 on top of the contaminant-reactant-containing article to dispose the geotextile sheet or mat 115 and the separate, or geotextile-contained copolymer, between lower flexible sheet material 136 between the geotextile sheet or mat 115 and the upper flexible, water-impermeable primary barrier layer 150. Adhesive vessel 161 preferably applies adhesive to a surface of sheet material 150 to adhere the sheet material 150 to an upper surface of the copolymer-containing geotextile sheet or mat 115.

The copolymer functions to absorb high conductivity multivalent ion-containing salt water regardless of its particle size. The powdered or granular copolymer preferably has a particle size in the range of about 10 µm to about 500 µm, preferably about 50 µm to about 1,000 µm, more preferably about 50 µm to about 800 um, and most preferably a particle size distribution of about 50 µm to about 800 µm containing up to 100% of the particles in the 50 µm to 200 µm range, preferably about 10 wt % to about 50 wt % in the 50 µm to 200 µm range, with 50 to 90 wt. % of the particles in the 200 µm to 800 µm size range.

Figure 12:
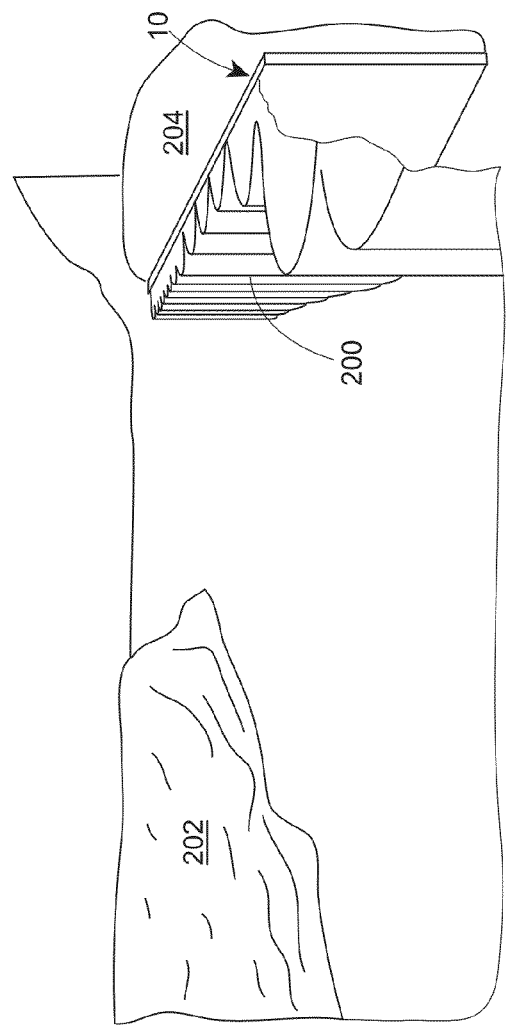
FIG. 12 is a schematic drawing illustrating a placement of a hydraulic barrier in accordance with an embodiment of the disclosure.

As shown in FIG. 12, the geocomposite articles 10 containing the partially cross-linked acrylamide/acrylate/acrylic acid copolymers described herein are particularly effective for vertical disposition adjacent to a sea/soil interface 200 for protecting the soil interface from salt water penetration by ocean 202 which would otherwise penetrate the sea/soil interface 200 into soil 204.

The geotextile sheet or mat 15 or 115 can be woven or non-woven, preferably non-woven. Suitable fibers of construction of the geotextile mat 15 or 115 include fibers made from rayon, polypropylene, polyesters, nylon, acrylic polymers and copolymers, ceramic fiber, fiberglass, propylene-ethylene copolymers, polypropylene-polyamide copolymers, a single monofilament, polyethylene, polyurethane, cotton, jute and any other non-biodegradable, or very slowly biodegradable, fibers preferably having both bacteriological, hydrolytic and chemical resistance. In some installations, the thickness of the article is not important and such articles can be formed with any desired thickness, e.g., 3 mils to about 4 inches containing about 0.1 oz to about 30 pounds per square foot of contaminant-reactant material.

The above-described products can be modified in a number of ways to suit various purposes and this adaptability of the products is one of the primary benefits when compared with water barriers of the prior art. For example, the geocomposite products described herein can be loaded with a heavy material such as metal screen, or a heavy mineral such as Barite, iron oxide or the like, relatively uniformly, together with the powdered or granular copolymer so that the overall product has a specific gravity greater than 1.0 thereby enabling the material to submerge easily in water. Accordingly, the product can be applied to the soil surface at the bottom of a filled lagoon, waste containment area, and the like, without first draining the lagoon or waste containment area. The product containing a heavy mineral can be rolled out over the water or waste containment upper level and allowed to sink to cover the soil surface at the bottom of the water or liquid waste material, thereby saving substantial time, effort and expense in sealing a pre-existing lagoon, waste containment area, and the like, without first draining the lagoon or waste containment area.

In another embodiment, the products described herein can have incorporated therein a very light material such as expanded vermiculite or expanded perlite, so that the product has substantial buoyancy in water, liquid waste materials, and the like, to form a cover over a liquid waste containment area, such as a toxic waste lagoon, to prevent external compounds, dust, and dirt from entering the waste containment area. One portion of this cover material can be adapted for removal or rolling back so that additional toxic waste and the like may be added to the covered containment area while maintaining a water-impervious cover to prevent further filling of the waste containment area with rain water.

The products described herein can be essentially a single copolymer-containing, non-woven fabric material, adhered to a water-impermeable cover layer, e.g., polyvinyl chloride (PVC) primary barrier sheet. Preferably, the geocomposite article includes an upper barrier layer, such as a polyvinyl chloride (PVC) sheet material adhesively secured to a woven or non-woven sheet material containing the partially cross-linked acrylamide/acrylate/acrylic acid copolymer. Further, drainage structures and other articles used in the water drainage arts can be virtually incorporated into the interior of this product during manufacture, e.g., under the upper cover sheet. Herbicides, bactericidal materials, tracer chemicals, various colorants that indicate contact with a particular chemical or class of chemicals, and the like, also can be incorporated into the articles described herein.

The product is particularly effective in shored wall conditions for application against steel sheet piling; soldier beam and lagging; soldier beam and earth installations; concrete caissons; earthen stabilized wall structures and diaphragm wall structures.

The uses for the powdered or granular material-filled or partially-filled products described herein are virtually infinite since the product can be made completely flexible, relatively rigid or rigid and can be applied against very contoured and slopping surfaces, rough or smooth, as well as vertical surfaces, such as foundation walls, dams, along the sides of canals and below grades such as in tank farms, and for irrigation and water conservation techniques.

In order to demonstrate the "healing" capacity of the partially cross-linked acrylamide/acrylate/acrylic acid copolymers described herein, geocomposite test articles were prepared from a PVC sheet material geomembrane having a thickness of 0.045 inch adhesively secured (using 2.30 grams of Bostik Supertak Aerosol Adhesive) to a non-woven polyethylene terephthalate (PET) fabric material containing 2.96 grams of STOCKOSORB S (partially cross-linked acrylamide/acrylate/acrylic acid copolymer) sandwiched between the geomembrane and the fabric layers. The PVC and PET sheet materials were circular sheets each 10 cm in diameter, having a surface area of 78.54 cm². The geocomposite test articles were cut with a 1 inch slit through all layers, as shown in FIG. 12.

What is claimed:

1. A method of waterproofing a tunnel comprising:
   positioning a drainage material against at least one of a tunnel wall and a ceiling, the drainage material have a first surface positioned against the at least one of the tunnel wall and the ceiling and a second surface exposed;
   attaching the drainage material to the at least one of the tunnel wall and the ceiling with a plurality of fastener plates disposed on the drainage material and fixing members that extend through the fastener plates and the drainage material and into the at least one of the tunnel wall and the ceiling, the fastener plates comprising a conductive element and a thermoplastic resin; and
   inductively welding a self-healing hydraulic barrier to the fastener plates, the self-healing hydraulic barrier comprising a water-impermeable thermoplastic layer adjoined to a water-absorbent material and a geotextile.

2. The method of claim 1 further comprising applying shotcrete against bored rock in a tunnel to form at least one of a smoothed tunnel wall and a smoothed ceiling; and curing the shotcrete; wherein the drainage material is positioned against the at least one of the smoothed tunnel wall and the smoothed ceiling.

3. The method of claim 1 further comprising applying concrete against the geotextile to form at least one of an interior tunnel wall and an interior ceiling; and curing the concrete.

4. The method of claim 3 further comprising applying a water-stop to all concrete joints.

5. The method of claim 1 further comprising positioning the drainage material against the tunnel floor, the drainage material have a first surface positioned against the tunnel floor and a second surface exposed; and
   covering the drainage material with the self-healing hydraulic barrier by positioning the water-impermeable thermoplastic layer against the drainage material.

6. A method of applying a water-proofing laminate to at least one of a retaining wall and a shoring wall comprising:
- positioning a drainage material against at least one of the retaining wall and the shoring wall, the drainage material have a first surface positioned against the at least one of the retaining wall and the shoring wall and a second surface exposed;
- attaching the drainage material to the at least one of the retaining wall and the shoring wall with a plurality of fastener plates disposed on the drainage material and fixing members that extend through the fastener plates and the drainage material, and into the at least one of the retaining wall and the shoring wall, the fastener plates comprising a conductive element and a thermoplastic resin; and
- inductively welding a self-healing hydraulic barrier to the fastener plates, the self-healing hydraulic barrier comprising a water-impermeable thermoplastic layer adjoined to a water-absorbent material and a geotextile.

7. The method of claim 6 further comprising applying concrete against the geotextile to form a water-proofed subgrade wall; and curing the concrete; wherein the concrete binds to the geotextile.

* * * * *